US012716270B2

(12) United States Patent
Wang

(10) Patent No.: US 12,716,270 B2
(45) Date of Patent: Aug. 25, 2026

(54) DOOR LOCK ASSEMBLY AND ELECTRICAL APPLIANCE

(71) Applicant: ILLINOIS TOOL WORKS INC., Glenview, IL (US)

(72) Inventor: Dongxuan Wang, Dongguan City (CN)

(73) Assignee: ILLINOIS TOOL WORKS INC., Glenview, IL (US)

(*) Notice: Subject to any disclaimer, the term of this patent is extended or adjusted under 35 U.S.C. 154(b) by 12 days.

(21) Appl. No.: 18/777,848

(22) Filed: Jul. 19, 2024

(65) Prior Publication Data

US 2025/0027342 A1 Jan. 23, 2025

(30) Foreign Application Priority Data

Jul. 21, 2023 (CN) ......................... 202310905659.0
Jul. 10, 2024 (CN) ......................... 202410927464.0

(51) Int. Cl.
*E05B 57/00* (2006.01)
*D06F 39/14* (2006.01)
*E05B 63/00* (2006.01)

(52) U.S. Cl.
CPC .............. *E05B 57/00* (2013.01); *D06F 39/14* (2013.01); *E05B 63/00* (2013.01)

(58) Field of Classification Search
CPC .... E05B 57/00; E05B 17/0025; E05B 15/022; E05B 15/0053; A47L 15/4259; D06F 39/14; D06F 34/20; D06F 37/42; E05C 5/00; E05C 5/02; E05C 2005/005
See application file for complete search history.

(56) References Cited

U.S. PATENT DOCUMENTS 7,306,266 B2 * 12/2007 Hapke ..................... D06F 37/42 292/192
8,376,418 B2 * 2/2013 Osvatic ..................... E05C 3/24 292/201
9,107,560 B2 * 8/2015 Bauriedl ............. A47L 15/4259
(Continued)

FOREIGN PATENT DOCUMENTS

EP 1304436 A2 * 4/2003 ............. D06F 39/14

*Primary Examiner* — Noah Horowitz
(74) *Attorney, Agent, or Firm* — Pauley Erickson & Swanson

(57) ABSTRACT

A door lock assembly includes a rotating wheel and a pin shaft. When subject to an internal push force, the door can drive the rotating wheel to rotate from a door-closing position towards a door-opening position, and the pin shaft and the rotating wheel abut against each other during the movement of the rotating wheel and perform a movement. The rotating wheel includes a cam structure, which abuts against the pin shaft and has an outer side and an inner side connected to each other. The inner side has a first working side surface and a second working side surface connected to each other, the outer side has a third working side surface. The first working side surface is a concave surface, the second working side surface protrudes in a first direction, and the third working side surface protrudes in a second direction. In a door-opening process, an abutment position of the cam structure towards the pin shaft sequentially transits from the first working side surface to the second working side surface and the third working side surface, thereby causing a change in the internal push force.

23 Claims, 17 Drawing Sheets

(56) References Cited

U.S. PATENT DOCUMENTS

| | | | | |
|---|---|---|---|---|
| 9,995,067 | B2 * | 6/2018 | Promutico | E05C 19/02 |
| 10,806,322 | B2 * | 10/2020 | Dirnberger | E05B 47/0603 |
| 11,272,826 | B2 * | 3/2022 | Krieger | E05C 19/02 |
| 12,096,901 | B2 * | 9/2024 | Czekala | A47L 15/4259 |
| 2015/0042105 | A1 * | 2/2015 | Promutico | E05C 19/024<br>292/100 |
| 2019/0040654 | A1 * | 2/2019 | Dirnberger | D06F 39/14 |
| 2020/0087957 | A1 * | 3/2020 | Tütek | E05C 3/24 |
| 2021/0238888 | A1 * | 8/2021 | Promutico | E05C 3/24 |
| 2025/0027341 | A1 * | 1/2025 | Wang | A47L 15/4259 |

* cited by examiner

DOOR LOCK ASSEMBLY AND ELECTRICAL APPLIANCE

CROSS-REFERENCE TO RELATED APPLICATIONS

Chinese Patent Application No. CN 2023109056590, filed on 21 Jul. 2023, the priority document corresponding to this invention, and Chinese Patent Application No. CN 2024109274640, filed on 10 Jul. 2024; to which a foreign priority benefit is claimed to each under Title 35, United States Code, Section 119, and their entire teachings are incorporated, by reference, into this specification.

BACKGROUND OF THE INVENTION

Field of the Invention

The present disclosure relates to a door lock assembly and a electrical appliance, and in particular, to a door lock assembly which is used in electrical appliances and capable of withstanding a certain degree of internal push force, and a electrical appliance using the door lock assembly.

Discussion of Related Art

In some commercial or household electrical appliances, door lock mechanisms may be used for locking or opening doors of the electrical appliances (such as a dryer, a washing machine, or a dishwasher). Bias springs are typically provided inside conventional door lock mechanisms, and when a door-opening displacement does not reach the critical door-opening displacement, the door lock mechanisms can cause the door to return to a closed state under the action of the bias spring after door-opening force has been removed. The above-mentioned door lock mechanisms need to be further provided with a child safety mechanism. For example, the door lock mechanism for a dryer with a door provided on a vertical side, when a child accidentally enters the dryer, it should be possible for the child to push the closed door open from the inner side of the door with a relatively small force, allowing the child to easily exit the dryer drum. In addition, such a door lock mechanism needs to prevent laundry inside the dryer from accidentally pushing the door open while the dryer is operating.

SUMMARY OF THE INVENTION

A door lock mechanism is typically provided with a rotating wheel therein, which comprises a lock hook capable of engaging with a door hook provided on the door to lock the door. The rotating wheel can rotate around a rotating shaft, such that the lock hook of the rotating wheel engages with or disengages from the door hook.

In one aspect, if bias springs acts directly on the rotating shaft of the rotating wheel, the rotating wheel and the rotating shaft thereof can compress the bias springs while moving linearly inside the door lock mechanism, thereby generating a bias force making the rotating wheel move reversely. However, the bias springs may undergo elastic deformation that deviates from the compression direction (a movement direction of the rotating shaft) during the compression or return process of being pressed by the rotating shaft, for example, undergo elastic deformation occurring in a direction other than the compression direction, causing the bias springs to generate a bias force on the rotating shaft in the direction other than the compression direction. For example, an acting force in a direction tangential to the compression direction causes the rotation of the rotating shaft to be subjected to an additional interference force, resulting in jerky, unstable or unsmooth up-and-down movement of the rotating wheel, which will cause the overall unsmooth hand feel of a door-opening operation, namely, a door-opening/closing action.

In another aspect, in a door lock mechanism provided with a child safety mechanism, an acting force required to push a door open from the inside of a dryer cannot be too large, for example, should be less than 67 Newtons. However, an overly low opening force will also lead to the door being accidentally pushed open by the rotating laundry in a drying process. It is necessary to consider the above two situations, so that the door is not prone to being pushed open by the laundry rotating centrifugally, yet the door can also be pushed open by a child from the inside of the dryer with a relatively small force.

In order to meet the above requirements for the door lock mechanism, the present disclosure provides a door lock assembly. A rotating wheel seat is provided inside a door lock housing, and a rotating wheel can be rotatably mounted on the rotating wheel seat. The rotating wheel seat is provided with at least one barrel shaped cavity. The cavity can be sized to just accommodate a bias spring, such that the bias spring can be accommodated in the barrel shaped cavity for compression or springback. Cavity walls of the barrel shaped cavities can limit the bending of the bias springs deviating from the compression direction, such that the bias springs can generate a springback force in proportion to a compression displacement in a compression process, which is acted on the bottoms of the barrel shaped cavities of the rotating wheel seat, and a bias force can be applied to linear movements of the rotating wheel seat and the rotating wheel inside the door lock housing. Since the bias springs generate the stable bias force, the rotating wheel seat and the rotating wheel move within the housing steadily, so that the overall hand feel of a door-opening/closing action is smooth without any jerking, instability or unevenness.

In a further aspect, a pin shaft is fixedly provided inside the door lock housing in the present disclosure, the pin shaft can always abut against the rotating wheel by means of the bias force of the bias springs, and during the rotation of the rotating wheel, the pin shaft can apply a variable acting force to the rotating wheel. A cam part on the rotating wheel in the present disclosure is provided with two curved surfaces having different curvatures, and the rotating wheel abuts against the pin shaft by means of any one of the above-mentioned two curved surfaces having different curvatures. When the rotating wheel begins to rotate from a door-closing position, the acting force applied by the pin shaft to the rotating wheel causes a required internal push force for door opening to quickly increase to the amount approximate to the maximum door-opening force. During a subsequent rotation, the door-opening force remains stable and slowly increases until the rotating wheel reaches a critical position for door opening. After the rotating wheel rotates beyond the critical position for door opening, even if the internal push force for door opening is removed, the rotating wheel will also automatically rotate to a corresponding position where the door is opened under the combined action of the bias springs and the pin shaft. If the door-opening force disappears before the rotating wheel rotates to the critical position for door opening, the rotating wheel will return to a corresponding position where the door is closed under the action of the bias force of the bias springs.

The advantage of providing the above cam part of the rotating wheel lies in giving consideration to the characteristic of an acting force applied on the door when laundry is rotating centrifugally inside the dryer, namely, the acting force is generated by the fact that the clumped laundry impinges against the door under the action of a centrifugal force, and when the laundry is displaced in a centrifugal direction, the clumped laundry will loosen up, and the impact force on the door will disappear immediately. That is, the acting force of the laundry applied on the door is dissipated before the rotating wheel rotates to the critical position for door opening, and the door will not be pushed open even if it is slightly displaced. However, a child who accidentally enters the dryer can make the rotating wheel to rotate beyond the critical position for door opening by applying a continuous internal push force to the door, and therefore the child can push the door open from the inside.

Therefore, the technical solution of the door lock assembly in the present disclosure will be described below.

According to the first aspect of the present disclosure, a door lock assembly is provided. The door lock assembly is used for locking a door of an electrical appliance, and is characterized by comprising a rotating wheel and a pin shaft, the rotating wheel having a rotating wheel door-closing position and a rotating wheel door-opening position during rotation, and the rotating wheel being configured such that when the door is subjected to an internal push force in the closing position, the door can drive the rotating wheel to rotate from the rotating wheel door-closing position towards the rotating wheel door-opening position, and the pin shaft and the rotating wheel abut against each other and undergo a relative movement during the movement of the rotating wheel; the rotating wheel is provided with a cam structure, the cam structure abuts against the pin shaft and has an outer side and an inner side connected to each other, the inner side has a first working side surface and a second working side surface connected to each other, the outer side has a third working side surface, the first working side surface is a concave surface, the second working side surface protrudes in a first direction, and the third working side surface protrudes in a second direction; and in the door-opening process, the abutment position of the cam structure of the rotating wheel against the pin shaft sequentially transits from the first working side surface, through the second working side surface to the third working side surface, thereby causing a change in the internal push force.

According to the first aspect of the present disclosure, the door lock assembly is characterized in that during the rotation of the rotating wheel from the rotating wheel door-closing position to the rotating wheel door-opening position, the abutment position of the pin shaft against the rotating wheel sequentially transits from the first working side surface, through the second working side surface to the third working side surface; and the internal push force increases at a first rate during the transition of the abutment position of the pin shaft against the rotating wheel from the first working side surface to the second working side surface, and the internal push force increases at a second rate or remains stable during the movement of the position of the pin shaft abutting against the rotating wheel at the second working side surface, wherein the second rate is less than the first rate.

According to the first aspect of the present disclosure, the door lock assembly is characterized by further comprising: at least one bias device, which is configured to bias the rotating wheel on the pin shaft during the rotation of the rotating wheel to maintain the abutment of the rotating wheel and the pin shaft against each other.

According to the first aspect of the present disclosure, the door lock assembly is characterized in that when the internal push force disappears before the rotating wheel rotates to allow the pin shaft to come into abutment against the third working side surface, the rotating wheel returns to the rotating wheel door-closing position under the action of a bias force of the at least one bias device; and when the internal push force disappears after the rotating wheel rotates to allow the pin shaft to come into abutment against the third working side surface, the rotating wheel moves to the rotating wheel door-opening position under the action of the bias force of the at least one bias device.

According to the first aspect of the present disclosure, the door lock assembly is characterized by further comprising: the housing, the pin shaft being fixedly connected on the housing; wherein the rotating wheel is movable relative to the pin shaft and the housing during the rotation of the rotating wheel; and wherein the rotating wheel door-closing position is corresponding to the closing position of the door, and the rotating wheel door-opening position is corresponding to the opening position of the door.

According to the first aspect of the present disclosure, the door lock assembly is characterized in that the rotating wheel comprises:

- a rotating wheel middle section which is provided with a rotating shaft, the rotating shaft of the rotating wheel being capable of linear movement relative to the pin shaft during the rotation of the rotating wheel;
- a rotating wheel head section which is provided with lock hooks, the lock hooks being configured to be detachably connected to a door hook of the door, such that the door opening or closing causes the rotating wheel to rotate around the rotating shaft toward the rotating wheel door-opening position or the rotating wheel door-closing position; and
- a rotating wheel tail section which is provided with the cam structure, the second working side surface of the cam structure having a variable curvature.

According to the first aspect of the present disclosure, the door lock assembly is characterized by further comprising: a rotating wheel seat which is movably accommodated inside the housing, the rotating shaft of the rotating wheel being rotatably mounted on the rotating wheel seat, the at least one bias device abutting between the rotating wheel seat and the housing, the rotating wheel seat being configured to move along with the rotation of the rotating wheel when the rotating wheel rotates, such that the rotating wheel and the rotating wheel seat are movable inside the housing, and the at least one bias device is compressed or springs back during the movement of the rotating wheel seat inside the housing.

According to the first aspect of the present disclosure, the door lock assembly is characterized in that the first working side surface is a notch; the inner side second segment is an ascending slope surface provided on an inner side of the cam structure; the outer side surface is a descending slope surface provided on an outer side of the cam structure; the notch and the ascending slope surface are connected at a slope surface inflection point; and the ascending slope surface and the descending slope surface are connected at the slope surface meeting point.

According to the first aspect of the present disclosure, the door lock assembly is characterized in that the curvature of the ascending slope surface gradually increases from the slope surface inflection point to the slope surface meeting point.

According to the first aspect of the present disclosure, the door lock assembly is characterized in that when the rotating wheel is in the rotating wheel door-opening position, the pin shaft abuts against a door-opening stop point of the rotating wheel on the descending slope surface; wherein the notch in the inner side of the cam structure and the door-opening stop point are stable positions during the rotation of the rotating wheel, and the positions of the cam structure other than the notch and the door-opening stop point are transition positions during the rotation of the rotating wheel.

According to the first aspect of the present disclosure, the door lock assembly is characterized in that when the rotating wheel is in the rotating wheel door-closing position, the pin shaft is located at the stable position of the notch, and when the rotating wheel is in the rotating wheel door-opening position, the pin shaft is located at the stable position of the door-opening stop point; and during the rotation of the rotating wheel from the rotating wheel door-closing position to the rotating wheel door-opening position, the abutment position of the pin shaft against the cam structure of the rotating wheel is moved, such that the abutment position of the pin shaft relative to the rotating wheel sequentially passes through the ascending slope surface and the descending slope surface from the notch, and finally reaches the door-opening stop point.

According to the first aspect of the present disclosure, the door lock assembly is characterized in that in the door-opening process, the at least one bias device is configured such that if the internal push force causes the rotating wheel to move relative to the pin shaft and to abut against a position between the notch and the slope surface meeting point, the at least one bias device can return, after the internal push force disappears, the rotating wheel relative to the pin shaft and to abut against the pin shaft at the stable position of the notch; and if the internal push force causes the rotating wheel to move relative to the pin shaft and to abut against a position between the slope surface meeting point and the door-opening stop point, the at least one bias device can continue to move, after the internal push force disappears, the rotating wheel relative to the pin shaft and to abut against the pin shaft at the stable position of the door-opening stop point.

According to the first aspect of the present disclosure, the door lock assembly is characterized in that if the internal push force is generated by clumped laundry in the electrical appliance impinging against the door, as the internal push force causes the rotating wheel to move from the rotating wheel door-closing position towards the rotating wheel door-opening position, if the clumped laundry is loosened before the rotating wheel moving to a position where the outer side surface abuts against the pin shaft, the internal push force then disappears, the rotating wheel can return to the rotating wheel door-closing position and thus closes the door.

According to the first aspect of the present disclosure, the door lock assembly is characterized in that if the internal push force is generated by manually continuing to push the door from the inside of the electrical appliance, as the internal push force causes the rotating wheel to move from the rotating wheel door-closing position towards the rotating wheel door-opening position, in case of the internal push force being removed after the rotating wheel moves to reach the position where the outer side surface abuts against the pin shaft, the rotating wheel can move to the rotating wheel door-opening position and thus opens the door.

According to the first aspect of the present disclosure, the door lock assembly is characterized in that when the "internal push force" is taken as the vertical coordinate and a "door-opening displacement" as the horizontal coordinate, the transition of the abutment position of the pin shaft against the rotating wheel from the first working side surface to the second working side surface corresponds to a first "internal push force versus door-opening displacement" curve, the movement of the abutment position of the pin shaft against the rotating wheel at the second working side surface corresponds to a second "internal push force versus door-opening displacement" curve, wherein the slope of the first "internal push force versus door-opening displacement" curve is larger than that of the second "internal push force versus door-opening displacement" curve.

According to the first aspect of the present disclosure, the door lock assembly is characterized in that the slope of the first "internal push force versus door-opening displacement" curve ranges from 80 degrees to 90 degrees; also, a span of the first "internal push force versus door-opening displacement" curve corresponding to a door-opening displacement is a first displacement, and the first displacement ranges from 0 mm to 2 mm.

According to the first aspect of the present disclosure, the door lock assembly is characterized in that the slope of the second "internal push force versus door-opening displacement" curve ranges from 0 degree to 15 degrees; also, a span of the second "internal push force versus door-opening displacement" curve corresponding to the door-opening displacement is a second displacement, and the second displacement ranges from 5 mm to 10 mm.

According to the second aspect of the present disclosure, a door lock assembly is provided. The door lock assembly is used for locking a door of an electrical appliance, and is characterized by comprising: a rotating wheel and a force adjustment device, the rotating wheel having a rotating wheel door-closing position and a rotating wheel door-opening position during rotation, and the rotating wheel being configured such that when the door is subjected to an internal push force in a closing position, the rotating wheel can rotate from the rotating wheel door-closing position towards the rotating wheel door-opening position; and the force adjustment device being configured to apply an adjustment force to the rotating wheel such that the rotating wheel has two sections of rotation paths during the rotation thereof from the rotating wheel door-closing position towards the rotating wheel door-opening position, and the two sections of rotation paths comprising: a first section of rotation path and a second section of rotation path, the first section of rotation path having a first path start point and a first path end point, the second section of rotation path having a second path start point and a second path end point, and the first path end point coinciding with the second path start point; wherein when the "internal push force" is taken as the vertical coordinate and a "door-opening displacement" as the horizontal coordinate, the first section of rotation path is corresponding to a first "internal push force versus door-opening displacement" curve, and the second section of rotation path is corresponding to a second "internal push force versus door-opening displacement" curve, the slope of the first "internal push force versus door-opening displacement" curve is greater than the slope of the second "internal push force versus door-opening displacement" curve; wherein the internal push force is a variable internal push force, if the variable internal push force is capable of moving the rotating wheel to any position between the first path start point and the second path end point, the rotating wheel returns to the rotating wheel door-closing position after the variable internal push force disappears; and if the variable internal push force is capable of moving the rotating wheel to a position beyond the second path end point, the rotating wheel moves to the rotating wheel door-opening position after the variable internal push force disappears.

According to the second aspect of the present disclosure, the door lock assembly is characterized in that the slope of the first "internal push force versus door-opening displacement" curve ranges from 80 degrees to 90 degrees; also, a span of the first "internal push force versus door-opening displacement" curve corresponding to a door-opening displacement is a first displacement, and the first displacement ranges from 0 mm to 2 mm; and the slope of the second "internal push force versus door-opening displacement" curve ranges from 0 degree to 15 degrees; also, a span of the second "internal push force versus door-opening displacement" curve corresponding to the door-opening displacement is a second displacement, and the second displacement ranges from 5 mm to 10 mm.

According to the second aspect of the present disclosure, the door lock assembly is characterized in that the ratio of the second displacement to the first displacement ranges from 5 to 20.

According to the second aspect of the present disclosure, the door lock assembly is characterized by further comprising: a rotating wheel seat and at least one bias device, the rotating wheel seat being configured such that the rotating wheel seat is driven by the rotating wheel to move when rotating along with the rotating wheel; the at least one bias device is configured such that if the adjustment force applied by the force adjustment device to the rotating wheel is capable of moving the rotating wheel to a position beyond the second path end point, the at least one bias device moves the rotating wheel to the rotating wheel door-opening position after the variable internal push force disappears; and if the adjustment force applied by the force adjustment device to the rotating wheel is capable of moving the rotating wheel to any position between the first path start point and the second path end point, the at least one bias device returns the rotating wheel to the rotating wheel door-closing position after the variable internal push force disappears; wherein the rotating wheel door-closing position is corresponding to the closing position of the door, and the rotating wheel door-opening position is corresponding to the opening position of the door.

According to the second aspect of the present disclosure, the door lock assembly is characterized in that:

the rotating wheel comprises a rotating wheel head section, a rotating wheel middle section and a rotating wheel tail section, the rotating wheel middle section is provided with the rotating shaft, the rotating wheel head section is provided with lock hooks, the lock hooks are configured to be capable of engaging with the door hook, and inserting the door hook into the door hook hole or pulling out the door hook from the door hook hole causes the rotating wheel to rotate around the rotating shaft in the door-opening direction or the door-closing direction; and the rotating wheel tail section is provided with the cam structure, the cam structure is provided with an inner side surface and an outer side surface, the inner side surface has an inner side first segment and an inner side second segment, and the first working side surface and the second working side surface have different curvatures;

wherein the first working side surface is corresponding to the first "internal push force versus door-opening displacement" curve, and the inner side second segment is corresponding to the second "internal push force versus door-opening displacement" curve.

According to the second aspect of the present disclosure, the door lock assembly is characterized in that the force adjustment device is a pin shaft; the first working side surface is a notch provided in an inner side of the cam structure; the second working side surface is an ascending slope surface provided on the inner side of the cam structure; the outer side surface is a descending slope surface provided on an outer side of the cam structure; the ascending slope surface and the descending slope surface are connected at a slope surface meeting point; and when the rotating wheel is in the rotating wheel door-opening position, the pin shaft abuts against the door-opening stop point of the rotating wheel on the descending slope surface; wherein the notch in the inner side of the cam structure and the door-opening stop point are stable positions during the rotation of the rotating wheel, and the positions of the cam structure other than the notch and the door-opening stop point are transition positions during the rotation of the rotating wheel; wherein when the rotating wheel is in the rotating wheel door-closing position, the pin shaft is located in the stable position of the notch, and when the rotating wheel is in the rotating wheel door-opening position, the pin shaft is located in the stable position of the door-opening stop point; and wherein during the rotation of the rotating wheel from the rotating wheel door-closing position towards the rotating wheel door-opening position, the pin shaft and the rotating wheel contact and perform a relative movement, such that the pin shaft reaches the door-opening stop point from the notch by passing through the ascending slope surface and the descending slope surface.

According to the second aspect of the present disclosure, the door lock assembly is characterized in that the relative movement of the pin shaft from the notch of the rotating wheel to the ascending slope surface is corresponding to the first section of rotation path; and the relative movement of the pin shaft from the ascending slope surface of the rotating wheel to the slope surface meeting point is corresponding to the second section of rotation path.

According to the second aspect of the present disclosure, the door lock assembly is characterized in that the shape of the first "internal push force versus door-opening displacement" curve depends on the shape of the notch; and the shape of the second "internal push force versus door-opening displacement" curve depends on the shape of the ascending slope surface.

According to the second aspect of the present disclosure, the door lock assembly is characterized in that there is further a third section of rotation path during the rotation of the rotating wheel from the rotating wheel door-closing position to the rotating wheel door-opening position; and the relative movement of the pin shaft from the slope surface meeting point of the rotating wheel to the door-opening stop point by passing through the descending slope surface is corresponding to the third section of rotation path.

According to the second aspect of the present disclosure, the door lock assembly is characterized in that the at least one bias device is configured, in a door-opening process, such that if the variable internal push force moves the pin shaft relative to the rotating wheel to reach a position before the slope surface meeting point, the at least one bias device returns, after the variable internal push force disappears, the pin shaft to the stable position of the notch; and if the variable internal push force moves the pin shaft relative to the rotating wheel to a position beyond the slope surface meeting point, the at least one bias device continues to move, after the variable internal push force disappears, the pin shaft relative to the rotating wheel to the stable position of the door-opening stop point.

According to the second aspect of the present disclosure, the door lock assembly is characterized by further comprising: a housing and a rotating wheel seat, the force adjustment device being fixed to the housing; the rotating wheel seat being movably accommodated inside the housing, the rotating shaft of the rotating wheel is rotatably mounted on the rotating wheel seat, such that the rotating shaft of the rotating wheel can drive the rotating wheel seat to perform a linear movement relative to the housing when the rotating wheel rotates; the at least one bias device abuts between the rotating wheel seat and the housing; and when the rotating wheel rotates on the rotating wheel seat, the rotating wheel and the rotating wheel seat can move inside the housing, and the at least one bias device can be compressed or spring back during the movement of the rotating wheel seat inside the housing.

According to a third aspect of the present disclosure, a electrical appliance is provided. The electrical appliance is characterized by comprising the door lock assembly described in the first aspect and the second aspect of the present disclosure.

Some of the additional aspects and advantages of the present disclosure will be set forth in the following description, and some will become apparent from the following description, or be learned by practice of the present disclosure.

DESCRIPTION OF PREFERRED EMBODIMENTS

Figure 1A:
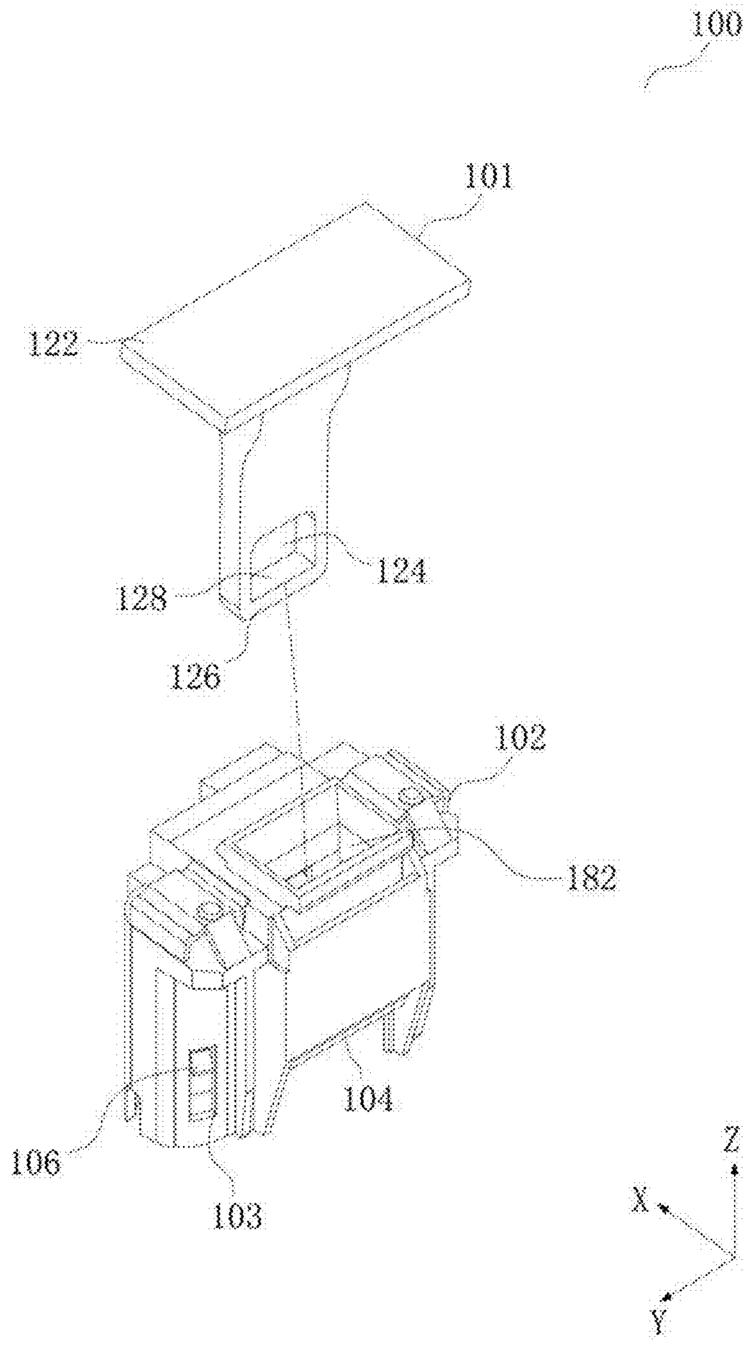
FIG. 1A is a perspective view of a door lock assembly of the present disclosure, in which a door hook is in an uninserted state.

Various specific implementations of the present disclosure will be described below with reference to the accompanying drawings which constitute part of the present disclosure, but does not limit the present disclosure. It should be understood that although the terms indicating directions, such as "upper", "lower", "left", "right", "front" and "rear" are used in the present disclosure to describe orientations of structural parts and elements in various examples of the present disclosure, these terms are used herein only for case of illustration and are determined based on the exemplary orientations shown in the accompanying drawings. Since the embodiments of the present disclosure can be arranged in different directions, these terms indicating directions are merely illustrative and should not be considered as limitations.

The term "comprise/include" and derivatives thereof mean inclusion without limitation. Unless otherwise specified and limited, the terms "mounting", "connecting" and "connected" should be understood broadly. For example, they may be a mechanical or electrical connection, internal communication between two elements, or a direct connection or indirect connection via an intermediate medium. For those of ordinary skills in the art, the specific meanings of the above terms can be understood according to specific cases. Where possible, the same or similar reference numerals used in the present disclosure refer to the same components.

Figure 1B:
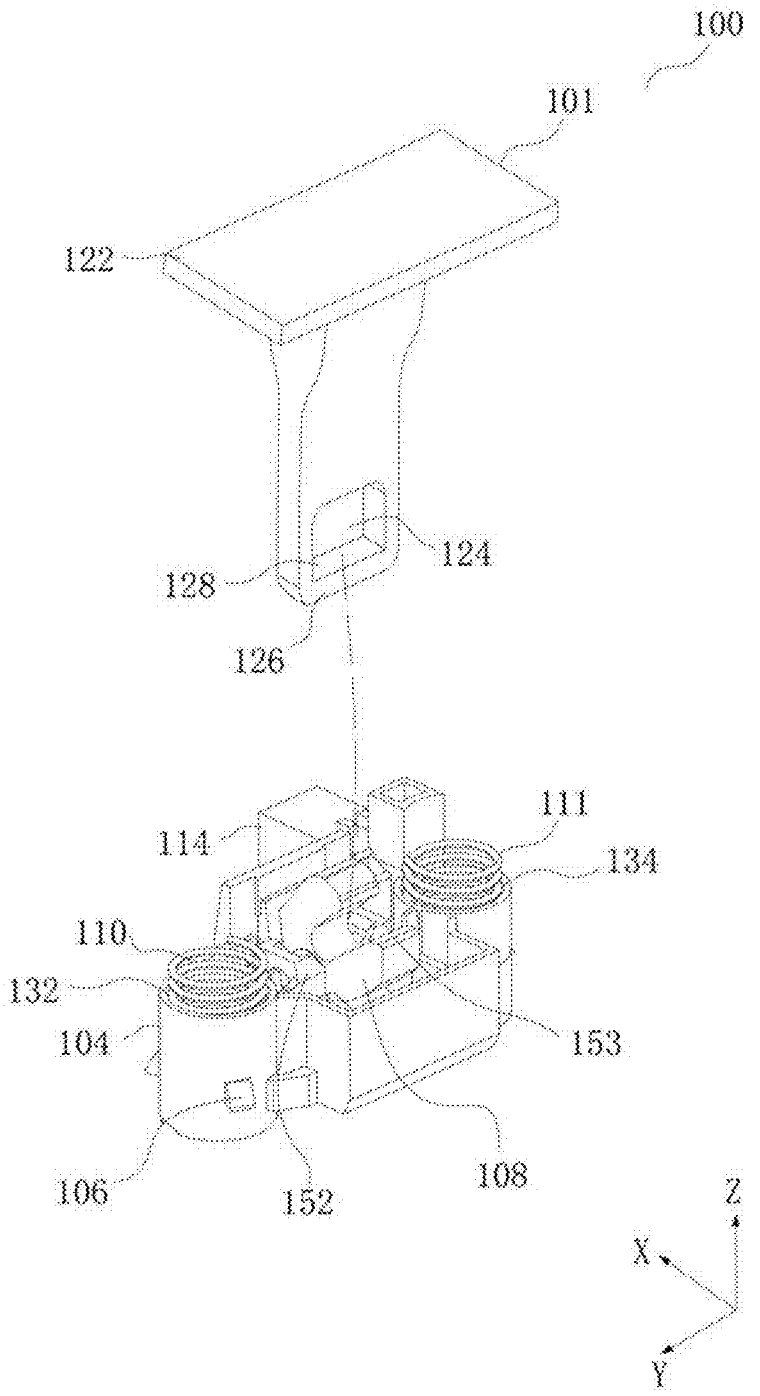
FIG. 1B is a perspective view of the door lock assembly with a housing hidden shown in FIG. 1A to show more components inside the housing.
Figure 1C:
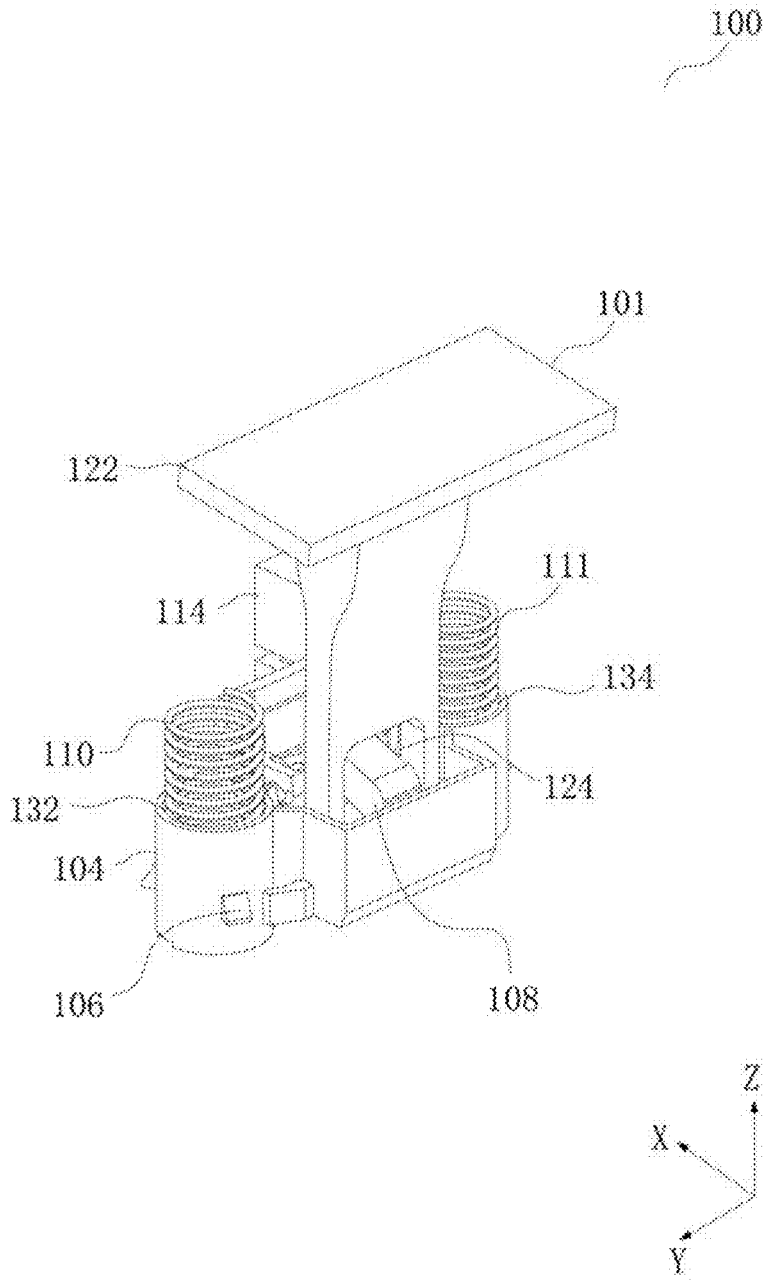
FIG. 1C is a state view of the door lock assembly shown in FIG. 1B after the door hook is inserted.
Figure 1D:
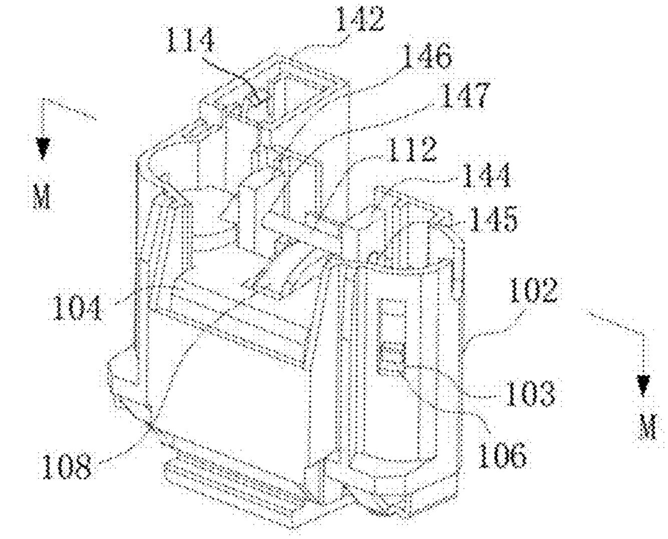
FIG. 1D is a perspective view of the door lock assembly shown in FIG. 1A from a bottom perspective to illustrate an assembly relationship between a pin shaft and the housing and a cooperation relationship between the pin shaft and the rotating wheel.
Figure 1E:
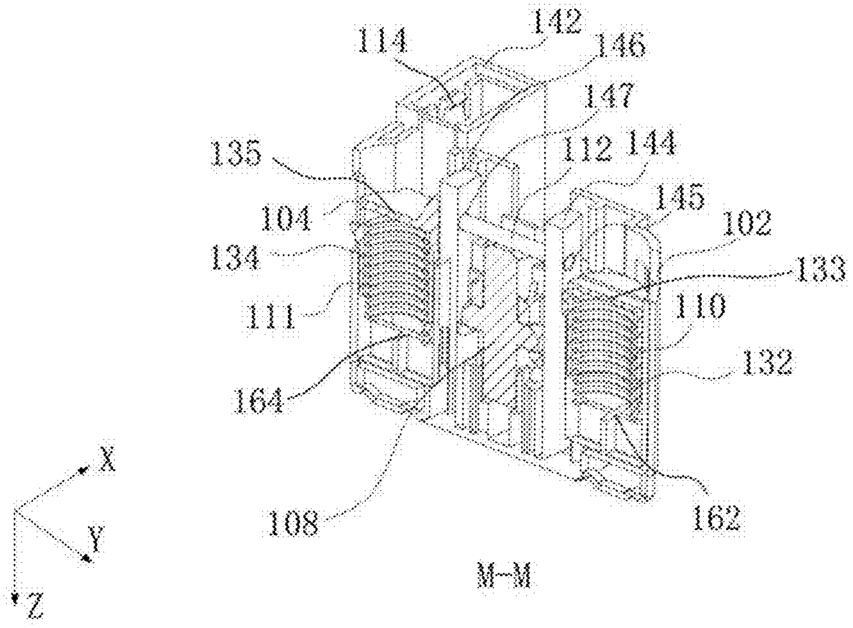
FIG. 1E is a cross-sectional view of the door lock assembly of FIG. 1D taken in an M-M direction to illustrate an assembly relationship between springs and the housing and the rotating wheel seat.

FIGS. 1A-1G is a perspective view of a door lock assembly 100 of the present disclosure from respective perspectives. FIG. 1B shows more components inside the housing 102 by hiding the housing 102 in FIG. 1A, and FIG. 1C is a state view of the door lock assembly 100 shown in FIG. 1B after a door hook 101 is inserted. FIG. 1D is a perspective view of the door lock assembly 100 shown in FIG. 1A from a bottom perspective to illustrate an assembly relationship between a pin shaft 112 and the housing 102 and a cooperation relationship between the pin shaft 112 and the rotating wheel 108, and FIG. 1E is a cross-sectional view of the door lock assembly 100 of FIG. 1D taken in an M-M direction to illustrate an assembly relationship between springs 110 and 111 and the housing 102 and a rotating wheel seat 104. FIGS. IF and IG are side views of the door lock assembly 100 shown in FIG. 1B to illustrate a cooperation relationship between a micro switch assembly actuating portion 172 of the rotating wheel seat 104 and a micro switch assembly 114.

It should be noted that, for the case of description and observation, FIG. 1A is taken as a reference below, a direction in which the housing 102 is directed from front to back is defined as a positive direction of X, a direction in which the housing 102 is directed from right to left is defined as a positive direction of Y, and a direction in which the door hook 101 is pulled out of the housing 102 is defined as a positive direction of Z (a direction in which the housing 102 is directed from up to down). Since the embodiments of the present disclosure can be provided in different directions, these terms X, Y and Z indicating directions are merely illustrative and should not be considered as limitations.

As shown in FIG. 1A, the door lock assembly 100 comprises the housing 102 and the rotating wheel seat 104 provided inside the housing 102. An upper surface of the housing 102 is provided with a door hook hole 182, which is configured to accommodate the door hook 101 mounted on a door of an electrical appliance. The door hook 101 is located above the door hook hole 182. After the door hook 101 is inserted into the door lock assembly 100 through the door hook hole 182 in the upper surface of the housing 102, the door hook 101 can engage with a rotating wheel (see the rotating wheel 108 in FIGS. 1B and 1C) inside the door lock assembly 100 in a hooked manner. When the rotating wheel 108 is locked, the door of the electrical appliance is also locked.

The door hook 101 comprises a door hook base 122, a door hook opening 124 and a door hook head 126, the door hook base 122 is mounted on the door of the electrical appliance, and the door hook head 126 has a door hook head upper side surface 128. When the door hook 101 is inserted into the door lock assembly 100, the door hook head 126 can push the rotating wheel 108 to rotate; when the door hook 101 is pulled out from the interior of the door lock assembly 100, the door hook head upper side surface 128 can pull the rotating wheel 108 to rotate in a reverse direction; and when the door is in a closed state, a part of the door hook 101 is held inside the door lock assembly 100, and the door hook opening 124 is caught by the rotating wheel 108, such that the door hook 101 is locked and cannot move.

As shown in FIG. 1A again, a housing limiting hole 103 provided in the Z direction is provided in the housing 102, and a rotating wheel seat limiting protrusion 106 is provided on an outer wall of the rotating wheel seat 104. The rotating wheel seat limiting protrusion 106 can protrude outwardly from an inner side of the housing limiting hole 103, and can reciprocate in the Z direction in a groove defined by the housing limiting hole 103, so that the rotating wheel seat 104 can be limited to reciprocate within the housing 102 in the Z direction.

FIGS. 1B and IC further illustrate schematic diagrams of the door hook 101 in the uninserted state and an inserted state.

As shown in FIGS. 1B and 1C, the door lock assembly 100 further comprises the rotating wheel 108, and the rotating wheel 108 is rotatably mounted on the rotating wheel seat 104, such that the rotating wheel 108 can rotate within the rotating wheel seat 104 in a door-opening direction or in a door-closing direction. Specifically, the rotating wheel seat 104 is provided with rotating wheel receiving portions 152 and 153 thereon, which are configured to mount the rotating shaft 208 (see FIG. 2) of the rotating wheel 108, such that the rotating wheel 108 can be rotatably fixed on the rotating wheel seat 104 to rotate.

With continued reference to FIGS. 1B and 1C, the door lock assembly 100 further comprises two bias springs 110 and 111. The barrel shaped cavities 132 and 134 are provided respectively on the left and right sides of the rotating wheel seat 104 in the Y direction, and each of the barrel shaped cavities 132 and 134 is configured to accommodate one of bias springs 110 and 111. The inner diameter of the barrel shaped cavities 132 and 134 is slightly greater than the outer diameter of the bias springs 110 and 111, such that when the bias springs are compressed in the barrel shaped cavities, no bending deformation deviating from the compression direction will be generated. One end of each of the bias springs abuts against the bottoms of the corresponding barrel shaped cavities 132 and 134, and the other end abuts against the inner side of the housing 102. If the housing 102 is fixed, when the rotating wheel seat 104 moves close to the housing 102 in the Z direction, the bias springs 110 and 111 are compressed, such that the bias springs 110 and 111 can apply a bias force to the rotating wheel seat 104 in a direction opposite to a movement direction of the rotating wheel seat 104, and thus the rotating wheel seat 104 tends to move away from the housing 102.

For those of ordinary skills in the art, only one barrel shaped cavity may be provided on the rotating wheel seat 104, and the corresponding door lock assembly 100 comprises only one bias spring, or more than two barrel shaped cavities are provided on the rotating wheel seat 104, and each barrel shaped cavity is configured to accommodate one bias spring, as long as the rotating wheel seat 104 can be subjected to the bias force of the bias spring when moving close to the housing 102 in the Z direction. Specifically, in a door-opening process, the rotating wheel seat 104 moves close to the housing 102, and the bias spring is compressed; and in a door-closing process, the rotating wheel seat 104 moves away from the housing 102, and the bias spring gradually springs back from a compressed state to an initial state.

With continued reference to FIGS. 1B and 1C, the door lock assembly 100 further comprises the micro switch assembly 114, and the micro switch assembly 114 is arranged close to the rotating wheel seat 104 in the Z direction. The micro switch assembly 114 is configured such that the micro switch assembly 114 is disconnected from the rotating wheel seat 104 when the rotating wheel 108 rotates from a rotating wheel door-closing position to a rotating wheel door-opening position, and the micro switch assembly 114 can be triggered by the rotating wheel seat 104 when the rotating wheel 108 rotates from the rotating wheel door-opening position to the rotating wheel door-closing position. The rotating wheel door-closing position is corresponding to a closing position of the door, and the rotating wheel door-opening position is corresponding to an opening position of the door.

FIG. 1D is a perspective view of the door lock assembly 100 shown in FIG. 1A from a bottom perspective to illustrate an assembly relationship between the pin shaft 112 and the housing 102 and a cooperation relationship between the pin shaft 112 and the rotating wheel 108.

As shown in FIG. 1D, the door lock assembly 100 further comprises the pin shaft 112, the housing 102 is further provided with left and right pin shaft mounting portions 144 and 146 thereon, and each of the pin shaft mounting portions 144 and 146 has one of corresponding pin shaft mounting holes 145 and 147 which are configured to securely mount the pin shaft 112. The housing 102 is provided with a micro switch assembly receiving portion 142 thereon, which is configured to receive the micro switch assembly 114.

FIG. 1E is a cross-sectional view of the door lock assembly 100 shown in FIG. 1D taken in an M-M direction to illustrate an assembly relationship between springs 110 and 111 and the housing 102 and the rotating wheel seat 104.

As shown in FIG. 1E, the barrel shaped cavities 132 and 134 of the rotating wheel seat 104 have cavity bottom surfaces 133 and 135 such that one end of one of the bias springs 110 and 111 accommodated in the barrel shaped cavities 132 and 134 can abut against the corresponding one of the cavity bottom surfaces 133 and 135. Spring abutment surfaces 162 and 164 are also provided correspondingly on an inner side of the housing 102 such that the other end of one of the bias springs 110 and 111 can abut against the corresponding one of the spring abutment surfaces 162 and 164. Therefore, the bias springs 110 and 111 are limited to be compressed between the cavity bottom surfaces 133 and 135 of the rotating wheel seat 104 and the spring abutment surfaces 162 and 164 of the housing 102, the cavity bottom surfaces 133 is provided opposite to the spring abutment surfaces 162 and the cavity bottom surfaces 135 is provided opposite to the spring abutment surfaces 164. Cavity walls of the barrel shaped cavities 132 and 134 can limit the bending deformations of the bias springs 110 and 111 deviating from the compression direction, such that the bias springs 110 and 111 can generate a springback force in proportion to a compression displacement during compression, and the springback force acts on the spring abutment surfaces 162 and 164 of the barrel shaped cavities 132 and 134 and can generate a bias force to the rotating wheel seat 104 and the rotating wheel 108. Since the bias spring generates the stable bias force, the movement of the rotating wheel seat 104 and the rotating wheel 108 inside the housing 102 are more stable compared with a rotating wheel in the prior art, so that the overall hand feel of a door-opening/closing action is smoother.

Figure 1F:
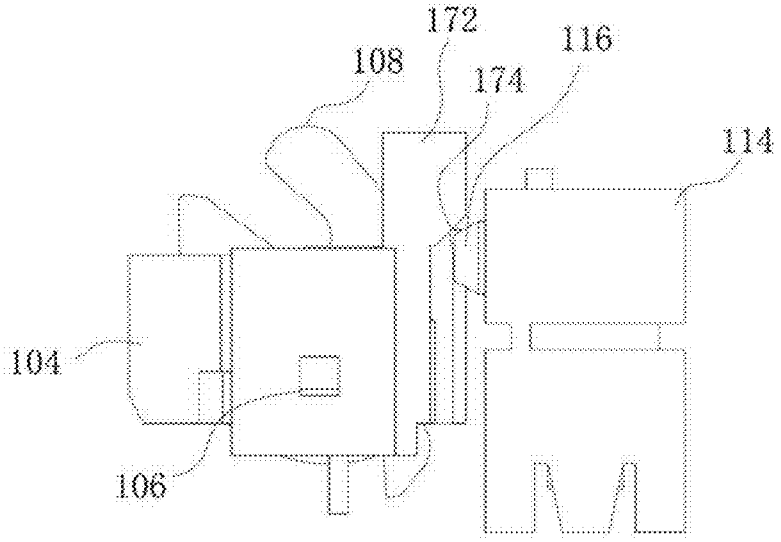
FIG. 1F is a side view of the door lock assembly shown in FIG. 1B to illustrate a cooperation relationship between a micro switch assembly actuating portion of the rotating wheel seat and a micro switch assembly, wherein the micro switch assembly is in an untriggered state.
Figure 1G:
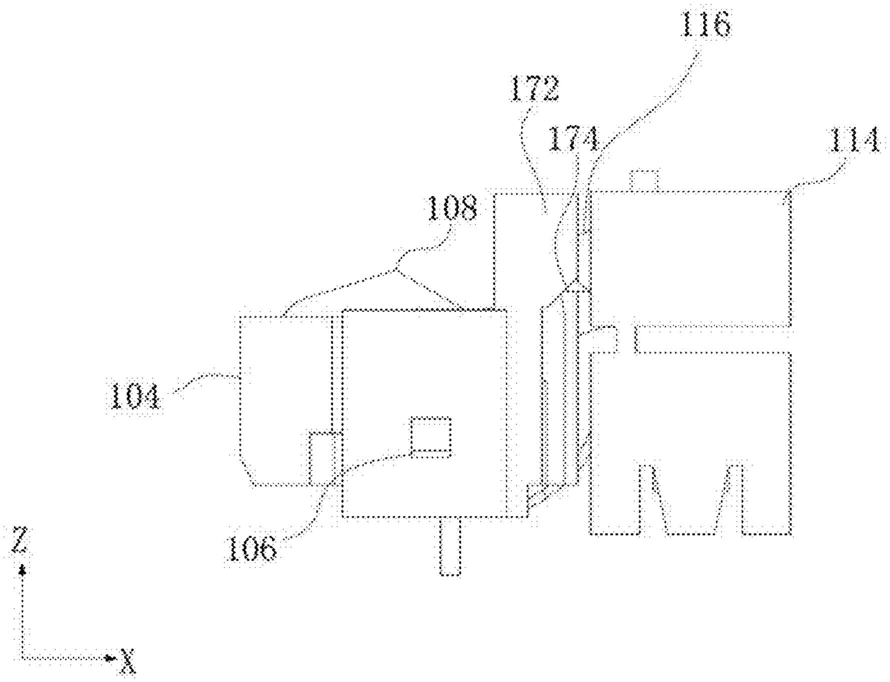
FIG. 1G is a side view of the door lock assembly shown in FIG. 1C to illustrate the cooperation relationship between the micro switch assembly actuating portion of the rotating wheel seat and the micro switch assembly, wherein the micro switch assembly is in a triggered state.

FIGS. 1F and 1G are side views of the door lock assembly 100 shown in FIG. 1B to illustrate a cooperation relationship between a micro switch assembly actuating portion 172 of the rotating wheel seat 104 and the micro switch assembly 114.

As shown in FIGS. 1F and 1G, a rear side of the rotating wheel seat 104 is further provided with the micro switch assembly actuating portion 172, and the micro switch assembly actuating portion 172 has a micro switch assembly actuating inclined surface 174. The micro switch assembly 114 has a button 116, the micro switch assembly 114 is triggered when the button 116 is pressed, and the micro switch assembly 114 is not triggered when the button 116 is not pressed. The micro switch assembly actuating portion 172 is configured such that when the rotating wheel seat 104 moves close to the spring abutment surfaces 162 and 164 of the housing 102, the micro switch assembly actuating inclined surface 174 does not press the button 116, such that the micro switch assembly 114 is not triggered; and when the rotating wheel seat 104 moves away from the spring abutment surfaces 162 and 164 of the housing 102, the micro switch assembly actuating inclined surface 174 presses the button 116, such that the micro switch assembly 114 is triggered.

Figure 2:
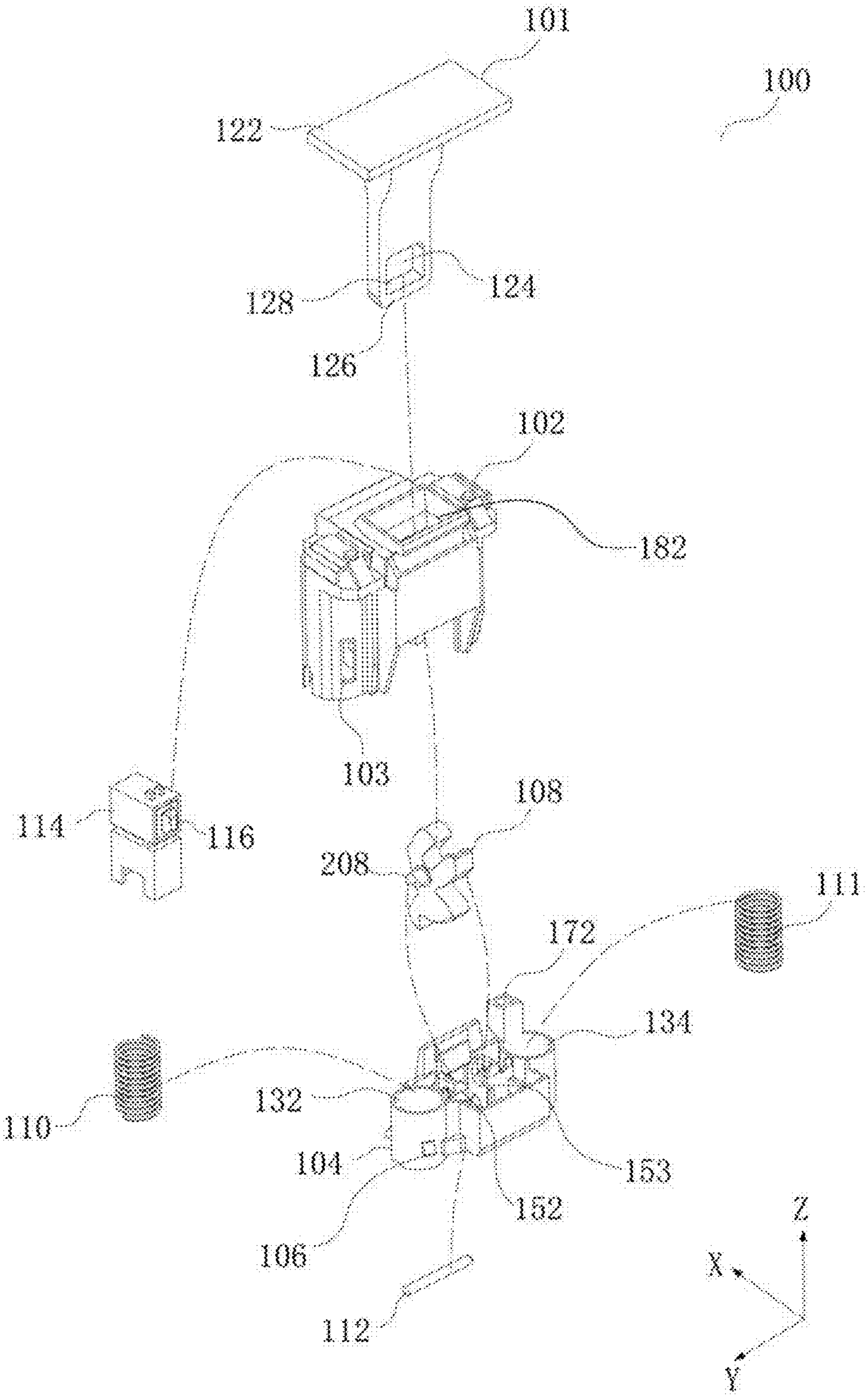
FIG. 2 is an exploded view of the door lock assembly of the present disclosure.

FIG. 2 is an exploded view of the door lock assembly 100 of the present disclosure to illustrate amounting relationship and a positional relationship of various components in the door lock assembly 100.

As shown in FIG. 2, the door hook 101 mounted on the door of the electric apparatus may be inserted into the housing 102 through the door hook hole 182 of the upper surface of the housing 102, such that the door hook engages with the rotating wheel 108 provided inside the housing 102. When inserted into the housing 102, the door hook 101 can impinge against the rotating wheel 108 to rotate the rotating wheel in the door-closing direction, and when pulled out of the housing 102, the door hook 101 can pull the rotating wheel 108 to rotate the rotating wheel in the door-opening direction. The rotating wheel 108 is rotatably mounted on the rotating wheel seat 104 by means of a rotating shaft 208 thereof, such that the rotating wheel 108 can rotate in the rotating wheel seat 104 in the door-opening direction or the door-closing direction, and except the rotation, any other type of movement of the rotating wheel 108 relative to the rotating wheel seat 104 will not occur. The rotating wheel seat 104 is limited in the housing limiting hole 103 of the housing 102 by means of the rotating wheel seat limiting protrusion 106, such that the rotating wheel seat 104 can move relative to the housing 102 only in an extending direction (the Z direction) of the housing limiting hole 103. The rotating wheel 108 and the rotating wheel seat 104 can move simultaneously relative to the housing 102 during the linear movement of the rotating wheel seat 104 relative to the housing 102. The pin shaft 112 is fixedly mounted to the lower end of the housing 102 and keeps abutting against the rotating wheel 108 by means of the bias springs 110 and 111. Since a cam outer circumference of the rotating wheel 108 has different rotation radii, the rotating wheel 108 can move, during the rotation, relative to the housing 102 by means of the abutment of the cam outer circumference thereof against the pin shaft 112, thereby driving the rotating wheel seat 104 to move relative to the housing 102. During the movement of the rotating wheel seat 104 relative to the housing 102, the micro switch assembly 114 provided inside the housing 102 can be actuated such that the micro switch assembly 114 is turned on or off.

Figure 3A:
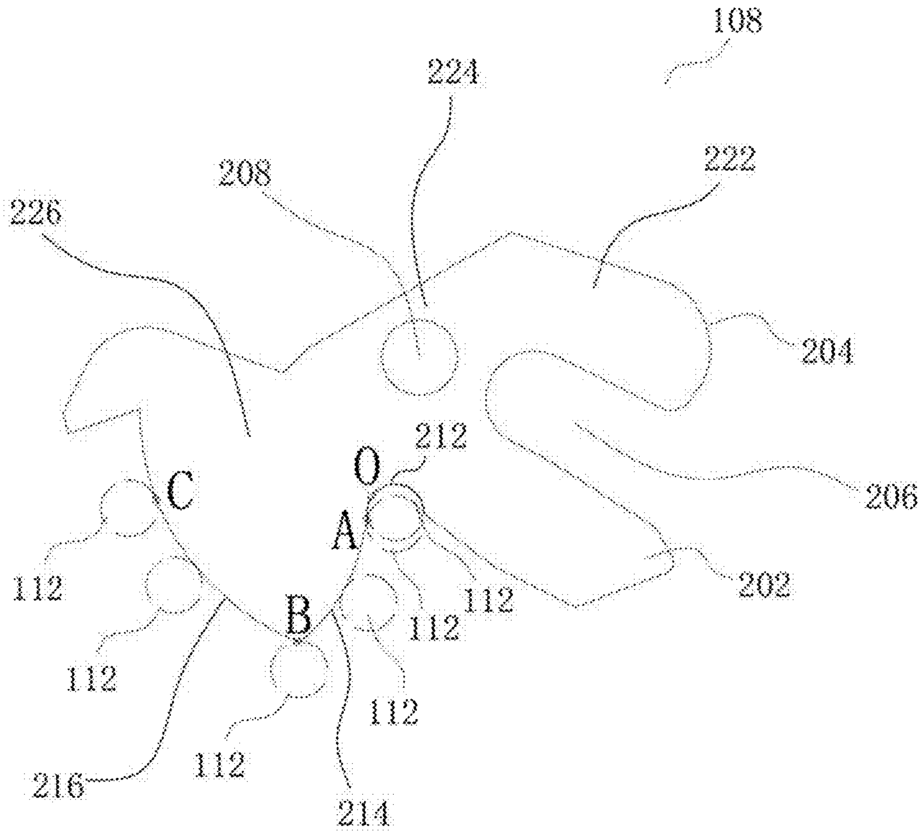
FIG. 3A is a front view of the rotating wheel and illustrates a relative positional relationship between the rotating wheel and the pin shaft when the rotating wheel is at different movement stages.
Figure 3B:
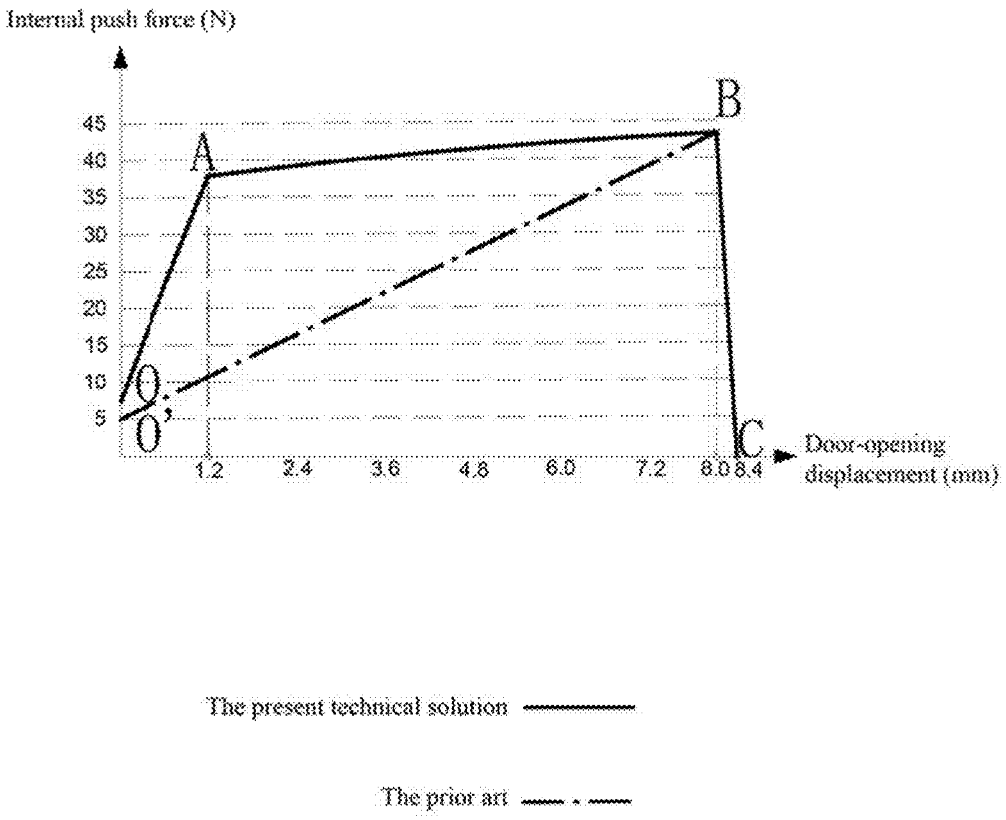
FIG. 3B is a graph of a curve relationship between an upward moving displacement (a door-opening displacement) of the rotating wheel seat and an internal push force to which the door is subjected.

FIG. 3A is a front view of the rotating wheel 108 and illustrates a relative positional relationship between the rotating wheel 108 and the pin shaft 112 at different movement stages, and FIG. 3B is a graph of a curve relationship between an upward moving displacement (a door-opening displacement) of the rotating wheel seat 104 and an internal push force to which the door is subjected.

As shown in FIG. 3A, the rotating wheel 108 comprises a rotating wheel head section 222, a rotating wheel middle section 224 and a rotating wheel tail section 226, the rotating wheel middle section 224 is provided with the rotating shaft 208, the rotating wheel head section 222 is provided with a lower lock hook 202, an upper lock hook 204 and a lock hook receiving cavity 206. When the door hook 101 is inserted into the housing 102, the door hook head 126 of the door hook 101 can impinge against the lower lock hook 202 of the rotating wheel 108, such that the rotating wheel 108 rotates in the door-closing direction (a clockwise direction); when the door hook 101 is pulled out of the housing 102, a door hook head upper side surface 128 of the door hook 101 can pull the upper lock hook 204 of the rotating wheel 108, such that the upper lock hook rotates in the door-opening direction (counterclockwise); and when the door is in the closed state, the door hook 101 is held inside the door lock assembly 100, and the door hook opening 124 of the door hook 101 is limited in a lock hook receiving cavity 206 of the rotating wheel 108, such that the door hook 101 is locked and cannot move.

The rotating wheel tail section 226 has a cam structure, and an outer circumference of the cam structure has different rotation radii. The cam structure is configured to be capable of abutting against the pin shaft 112, such that when the rotating wheel 108 rotates in the rotating wheel seat 104 in the door-opening direction or in the door-closing direction, the rotating wheel 108 along with the rotating wheel seat 104 can move within the housing 102, and the bias springs 110 and 111 can be compressed or spring back in the barrel shaped cavities 132 and 134 during the movement of the rotating wheel seat 104 inside the housing 102, so that the bias force is applied to the rotating wheel seat 104 and the rotating wheel 108.

The cam structure of the rotating wheel 108 is provided with an inner side and an outer side connected to each other, and the inner side has a first working side surface 212 and a second working side surface 214 connected to each other, the outer side has a third working side surface 216, the first working side surface 212 is a concave surface, the second working side surface 214 protrudes in a first direction, and the third working side surface 216 protrudes in a second direction; in the door-opening process, an abutment position between the cam structure of the rotating wheel 108 and the pin shaft 112 sequentially transits from the first working side surface 212, through the second working side surface 214 to the third working side surface 216, thereby causing a change in the internal push force.

Specifically, with continued reference to FIG. 3A, in an embodiment of the present disclosure, the inner side comprises a circular notch 212 and a rising slope surface 214, and the outer side comprises a descending slope surface 216. The circular notch 212 connects to the rising slope surface 214 at point A, and the rising slope surface 214 connects to the descending slope surface 216 at point B. The notch inner diameter of the circular notch 212 is the same as the shaft outer diameter of the pin shaft 112, such that the pin shaft 112 can be exactly snapped in the circular notch 212, and a position where the pin shaft 112 is snapped in the circular notch 212 is a stable position corresponding to the position where the rotating wheel 108 is in the rotating wheel door-closing position.

When the rotating wheel 108 trends to rotate in the door-opening direction (a counterclockwise direction in FIG. 3A), an acting force point at which the pin shaft 112 abuts against the circular notch 212 occurs at point O of the circular notch 212, and in this case, the rotating wheel 108 is in the rotating wheel door-closing position. When the door is completely opened, the rotating wheel 108 abuts against a rotating wheel stop part 402 (see FIG. 8C) of the rotating wheel seat 104. In this case, the rotating wheel 108 is in the rotating wheel door-opening position, and the pin shaft 112 abuts against point C of the descending slope surface 216 of the rotating wheel 108, namely, a stable position of the rotating wheel 108 in the rotating wheel door-opening position.

With continued reference to FIG. 3A, for the case of the following description, an outer contour of the cam structure is divided into three segments, namely, an OA segment of the circular notch 212 of the inner side of the cam structure, an AB segment of the rising slope surface 214 of the inner side of the cam structure, and a BC segment of the descending slope surface 216 of the outer side of the cam structure. Apart from the OA segment, the AB segment, and the BC segment, other segments of the outer contour of the cam structure will not be described herein.

It can be seen that the cam structure of the rotating wheel 108 has different curvatures at the OA segment, the AB segment and the BC segment, wherein the curvature of the OA segment is approximately equal to the curvature of the outer diameter of the pin shaft 112, the curvature of the AB segment gradually increases from point A to point B, and the curvature of the BC segment remains consistent. In the process of the rotating wheel 108 rotating from the rotating wheel door-closing position to the rotating wheel door-opening position, the pin shaft 112 abuts against the rotating wheel 108 at these segments of the rotating wheel 108 having different curvatures, and meanwhile, the rotating wheel 108 further has different rotating wheel rotation radii at these segments having different curvatures, such that an interaction force generated when the pin shaft 112 abuts against the rotating wheel 108 at these segments having different curvatures is variable, and under the combined action of the variable acting force of the pin shaft 112 and the bias force of the bias springs, a force (i.e. the internal push force or a door-opening force) required to pull the rotating wheel 108 has a variable trend as shown in FIG. 3B. Therefore, in the door lock mechanism of the present disclosure, the pin shaft 112 may also be regarded as a force adjustment device for the internal push force.

As shown in FIG. 3B, an "internal push force versus door-opening displacement" curve (hereinafter referred to as the "curve") can be obtained by taking "the internal push force" as a vertical coordinate, and "a door-opening displacement" as a horizontal coordinate. The curve denoted by a full line is a curve of a correlation between the door-opening displacement and the internal push force in the technical solution of the present disclosure, and a curve denoted by a dotted line is a curve of a correlation between the door-opening displacement and an internal push force in the prior art.

The curve of the technical solution of the present disclosure has four critical points O, A, B and C. The four points O, A, B, and C are corresponding to four abutment positions of the pin shaft 112 and the rotating wheel 108, namely, an abutment point O of the pin shaft 112 corresponding to the rotating wheel door-closing position, an abutment point A of the pin shaft 112 at a joint of the OA segment and the AB segment of the rotating wheel 108, an abutment point B of the pin shaft 112 at a joint of the AB segment and the BC segment of the rotating wheel 108, and an abutment point C of the pin shaft 112 corresponding to the rotating wheel door-opening position. The OA segment, the AB segment and the BC segment of the curve respectively correspond to the abutment positions of the pin shaft 112 against the cam structure of the rotating wheel 108 at the OA segment, the AB segment and the BC segment. If it is considered that the rotating wheel 108 is stationary, in the door-opening process, the pin shaft 112 passes, from the circular notch 212, through the OA segment, the AB segment and the BC segment relative to the rotating wheel 108, and moves to point C of the descending slope surface 216. In the door-closing process, the pin shaft 112 passes, from point C of the descending slope surface 216, through the BC segment, the AB segment and the OA segment relative to the rotating wheel 108 and moves to the circular notch 212.

When the door is subjected to the internal push force in the closing position, the rotating wheel 108 can rotate counterclockwise from the rotating wheel door-closing position towards the rotating wheel door-opening position. The pin shaft 112 serves as the force adjustment device for an internal push force, and can apply an adjustment force to the rotating wheel 108 by abutting against the rotating wheel 108. This adjustment force enables the rotating wheel 108 to show two rotating path curves in the process of rotating from the rotating wheel door-closing position to the rotating wheel door-opening position, including: a first segment of rotating path (OA segment) and a second segment of rotating path (AB segment), the first segment of rotating path (OA segment) having a first path start point (O) and a first path end point (A), the second segment of rotating path (AB segment) having a second path start point (A) and a second path end point (B), and the first path end point coinciding with the second path start point. It can be seen, on the "internal push force versus door-opening displacement" curve, the slope of the first segment of rotating path (OA segment) is much greater than the slope of the second segment of rotating path (AB segment).

The slope and shape of the first segment of rotating path (OA segment) depends on the curvature and shape of the circular notch 212, and the slope and shape of the second segment of rotating path (AB segment) depends on the curvature and shape of the rising slope surface 214. In one embodiment of the present disclosure, the first segment of rotating path (OA segment) has a slope ranging from 80 degrees to 90 degrees, and a displacement corresponding to the first segment of rotating path (OA segment) ranges from 0 mm to 2 mm; the second segment of rotating path (AB segment) has a slope ranging from 0 degrees to 15 degrees, and a displacement corresponding to the second segment of rotating path (AB segment) ranges from 5 mm to 10 mm; and the ratio of the displacement corresponding to the second segment of rotating path (AB segment) to the displacement corresponding to the first segment of rotating path (OA segment) ranges from 5 to 20.

An adjustment force from the pin shaft 112 (force adjustment device) causes the internal push force to be embodied as the variable internal push force as depicted in FIG. 3B. If the variable internal push force can only move the rotating wheel 108 to any position between the first path start point (O) and the second path end point (B), and after the variable internal push force disappears, the rotating wheel 108 will return to the rotating wheel door-closing position, namely, the position where the pin shaft 112 is snapped in the circular notch 212 of the rotating wheel 108; and if the variable internal push force can move the rotating wheel 108 to a position beyond the second path end point B, the rotating wheel 108 will move to the rotating wheel door-opening position after the variable internal push force disappears. That is to say, when the rotating wheel 108 rotates to abut against the pin shaft 112 by means of the BC segment, under the combined action of the bias force of the bias springs and the abutment force of the pin shaft, the rotating wheel 108 can automatically rotate to the rotating wheel door-opening position, namely, the position where the rotating wheel 108 abuts against the pin shaft 112 at point C, without the internal push force. In consideration of actual factors such as a friction force, the BC segment of the curve is approximate to be a vertical line perpendicular to the horizontal axis.

It can be seen that there is a door-opening displacement caused by a machinery manufacturing tolerance in front of point O on the curve in the technical solution of the present disclosure, and the first path start point O begins after a tolerance movement. Also, the internal push force required by an initial displacement corresponding to point O on the curve ranges from 5 N to 10 N, which indicates that the rotating wheel 108 initially can not rotate or move until a static friction force from an adjacent component is overcome.

Accordingly, when the door is subjected to an external push force in the opening position, the rotating wheel 108 can rotate in a clockwise direction from the rotating wheel door-opening position to the rotating wheel door-closing position. Contrary to the above process, the pin shaft 112 first abuts against the rotating wheel 108 at point C; with the further insertion of the door hook 101, the rotating wheel 108 rotates clockwise, the abutment position between the pin shaft 112 and the rotating wheel 108 is moved from point C to point B by passing through the BC segment, then moved to point A by passing through the AB segment, and finally moved to point O by passing through the OA segment.

With continued reference to FIG. 3B, a curve of a correlation between a door-opening displacement and an internal push force in the prior art has three critical points O', B and C, wherein point O' is very close to point O, an O'B segment is approximate to a straight line, and the slope of the O'B segment is less than the slope of the OA segment in the technical solution of the present disclosure.

As known to those skilled in the art, the internal push force to which the door is subjected to would have done work on the door lock assembly in the door-opening process, and the magnitude of the work is the accumulation (integral) of the internal push force on the door-opening displacement, which reflects the area enclosed by the curve and the horizontal and vertical axes in FIG. 3B. It can be seen that the work done by the internal push force in the door-opening process in the technical solution of the present disclosure is obviously greater than the work done by the internal push force in the door-opening process in the prior art, because the internal push force required for door opening at an initial stage of door opening (e.g., a stage before point A corresponding to the door-opening displacement of 1.2 mm) in the technical solution of the present disclosure can rapidly increase to range from 35 Newtons to 45 Newtons, and the door can be pushed open only by means of continuous pushing it to achieve a displacement cumulatively approximate to 8 mm under the action of the internal push force (continuously increasing slowly), while the door-opening displacement corresponding to the same door-opening force achieved in the prior art is approximately 7 mm. However, the maximum internal push force required for door opening in the technical solution of the present disclosure is kept consistent with that in the prior art, that is, ranges from 40 Newtons to 45 Newtons (the magnitude of the internal push force corresponding to point B), and therefore the technical solution of the present disclosure will not increase the difficulty of pushing the door from the inside by a child. On the contrary, with regard to the same laundry impact force (an initial impact kinetic energy of laundry), if an impact force can just overcome the door-opening resistance in the prior art to push the door open by doing work, the door in the technical solution of the present disclosure cannot be pushed open by this impact force. In the embodiments of the present disclosure, a required work done to overcome a door-opening resistance in the technical solution of the present disclosure is 55% more than that required in the prior art.

FIGS. 4A-8C are schematic diagrams of the rotating wheel 108 and the pin shaft 112 in different abutment positions in the door-opening process.

Figure 4A:
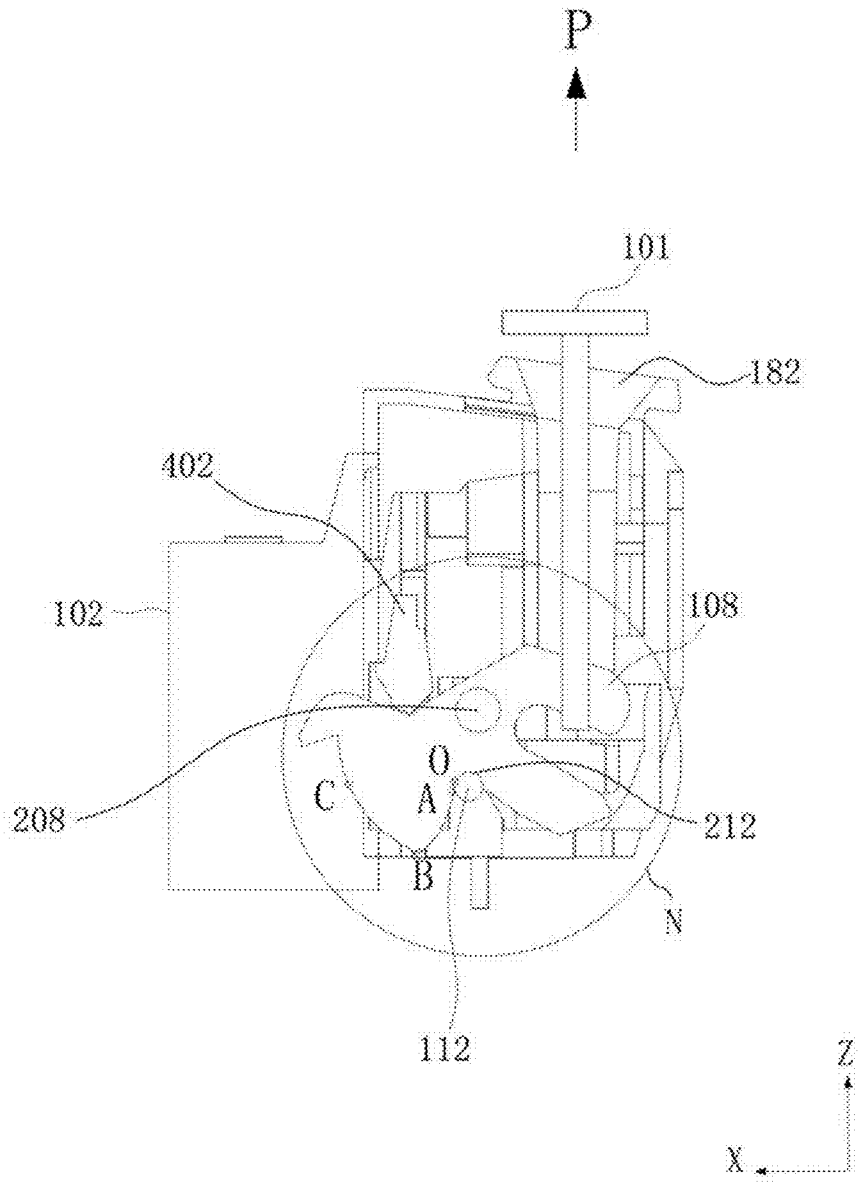
FIG. 4A is an interior side view of the door lock assembly of the present disclosure, wherein the door hook is in a maximum inserted state, and the pin shaft abuts against point O of a force bearing surface of the rotating wheel.
Figure 4B:
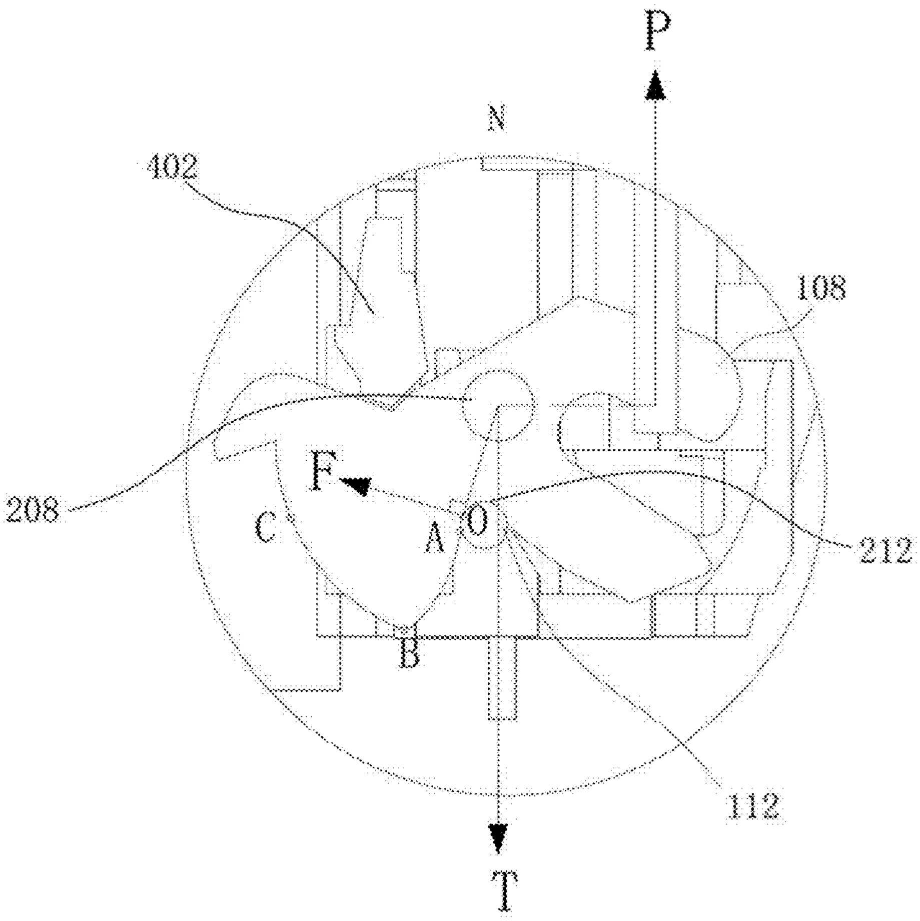
FIG. 4B is an enlarged view of the rotating wheel shown in FIG. 4A and a force analysis view N.

FIG. 4A is an interior side view of the door lock assembly 100 of the present disclosure, in which the door hook 101 is in a maximum inserted state, and the pin shaft 112 abuts against point O of the force bearing surface of the rotating wheel 108; in order to illustrate a cooperation relationship between various components inside the door lock assembly 100, parts of a structure of the housing 102 is hidden. FIG. 4B is an enlarged view of the rotating wheel 108 shown in FIG. 4A and a force analysis view N.

As shown in FIG. 4A, the rotating wheel seat 104 is provided with the rotating wheel stop part 402 thereon, which is configured to limit a rotation range of the rotating wheel 108, such that when the rotating wheel 108 rotates from the rotating wheel door-closing position to the rotating wheel door-opening position, the rotating wheel 108 can be stopped by the rotating wheel stop part 402 and can thus be stabilized at the position where the pin shaft 112 abuts against point C of the descending slope surface 216 of the cam. FIG. 4A shows the rotating wheel 108 in the rotating wheel door-closing position, namely, in a state where the door is in the closed position, at this time the pin shaft 112 abuts within the circular notch 212 of the rotating wheel 108.

As shown in FIG. 4B, when the rotating wheel 108 in the rotating wheel door-closing position is subjected to a door-opening pull force P (corresponding to the internal push force to which the door is subjected) from the door hook, the rotating wheel 108 trends to rotate counterclockwise, and it is required to overcome, before the rotating wheel 108 rotates or moves, the influence of an initial manufacturing tolerance and a static friction force, and to generate an interaction force F with the pin shaft 112 before the movement. In this case, the bias springs are not yet compressed, and thus the rotating wheel seat 104 and the rotating wheel 108 are not yet subject to a spring force T of the bias springs in the Z direction (a vertical direction). Once the rotating wheel 108 begins to rotate counterclockwise, the bias springs are compressed, and the rotating wheel seat 104 and the rotating wheel 108 are then subject to the spring force T of the bias springs in the Z direction, the spring force T acts on the center of the rotating shaft 208 of the rotating wheel 108, and therefore no additional torque is brought to the rotating wheel 108. The door-opening pull force P and the counter-acting force F of the pin shaft 112 each apply a directionally opposite torque to the rotating wheel 108, and the torques generated by the two forces are equal in magnitude. The door-opening pull force P, the counter-acting force F, and an acting force applied by the spring force T of the bias springs to the rotating wheel 108 in the Z direction (the vertical direction) are balanced with each other.

Figure 5:
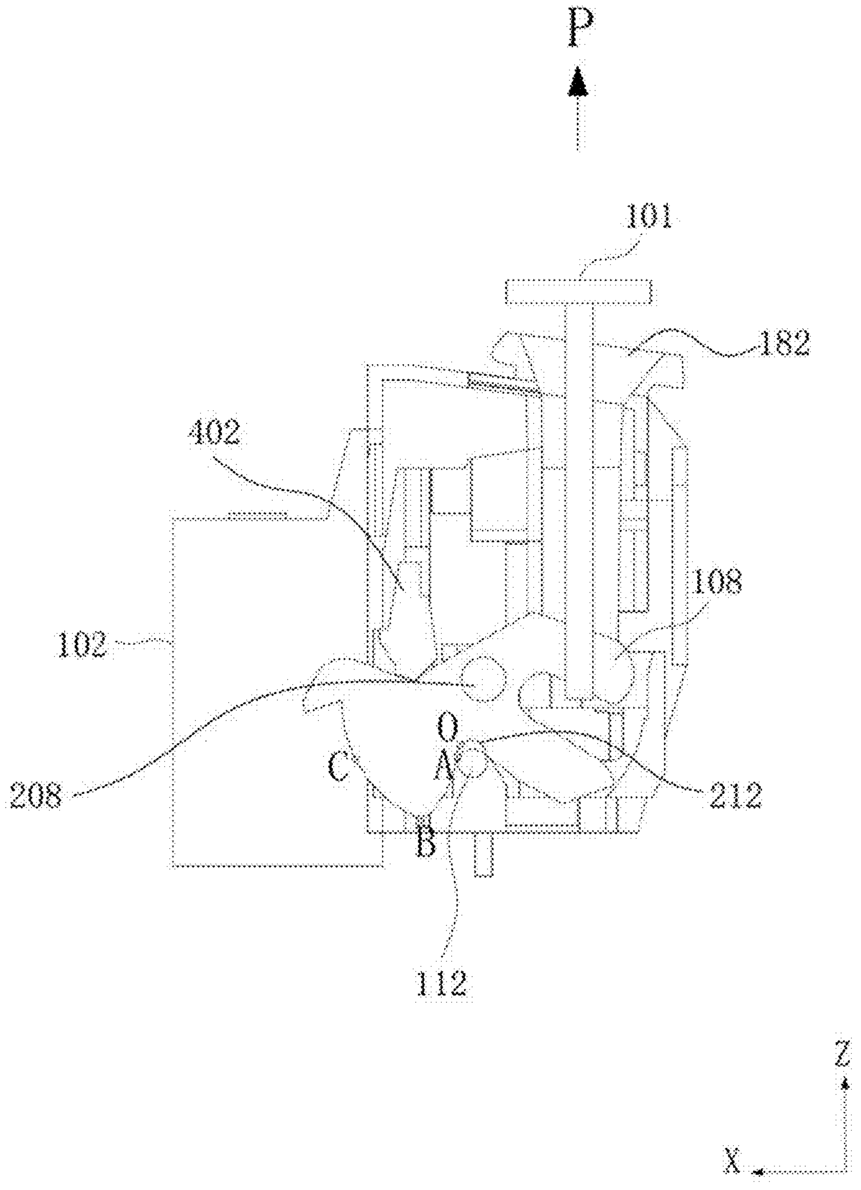
FIG. 5 is a schematic diagram of the door hook pulling the rotating wheel upward, wherein the pin shaft abuts against point A of the force bearing surface of the rotating wheel.

FIG. 5 is a schematic diagram of the door hook 101 pulling the rotating wheel 108 upward, wherein the pin shaft 112 abuts against point A of the force bearing surface of the rotating wheel 108.

As shown in FIGS. 4A and 5, after the rotating wheel 108 begins to rotate, the continuous door-opening pull force P is applied to the rotating wheel 108, the rotating wheel 108 can rotate from a position shown in FIG. 4A and translate upward to a position shown in FIG. 5. In this case, the pin shaft 112 is moved relative to the rotating wheel 108 from the position abutting within the circular notch 212 of the rotating wheel 108 to point A of the force bearing face, and abuts against the rotating wheel 108 at point A. The rotating wheel 108 translates counterclockwise and upward in the process of abutting against the pin shaft 112, the outer contour of the rotating wheel 108 at the OA segment is shaped to allow the pin shaft 112 to generate the counter-acting force F thereon, which causes the door-opening pull force P to rapidly increase along with the door-opening displacement, thus forming the shape of the curve's OA segment shown in FIG. 3B. At point A shown in FIG. 5, the door-opening pull force P or the internal push force ranges from 35 Newtons to 45 Newtons, and the door-opening displacement is only about 1.2 mm.

Figure 6:
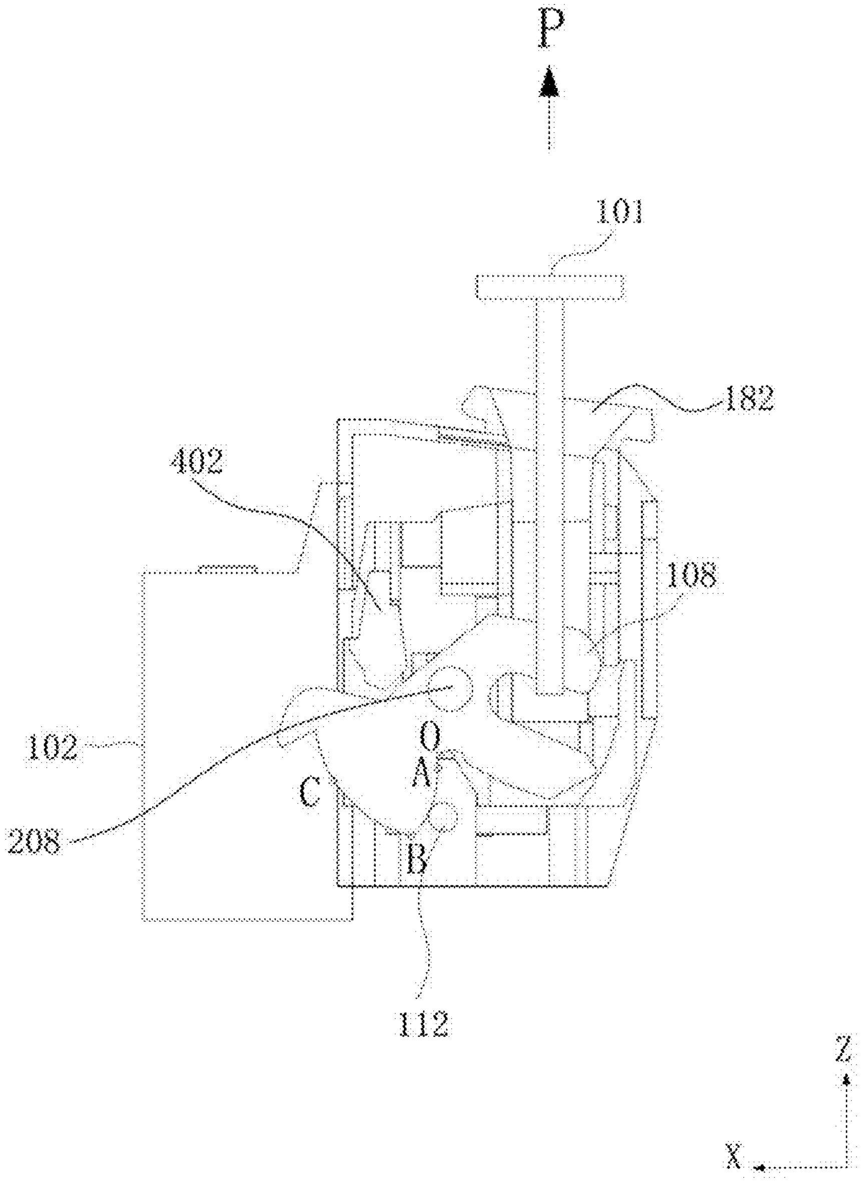
FIG. 6 is a schematic diagram of the door hook pulling the rotating wheel upward, wherein the pin shaft abuts against an AB segment of the force bearing surface of the rotating wheel.
Figure 7:
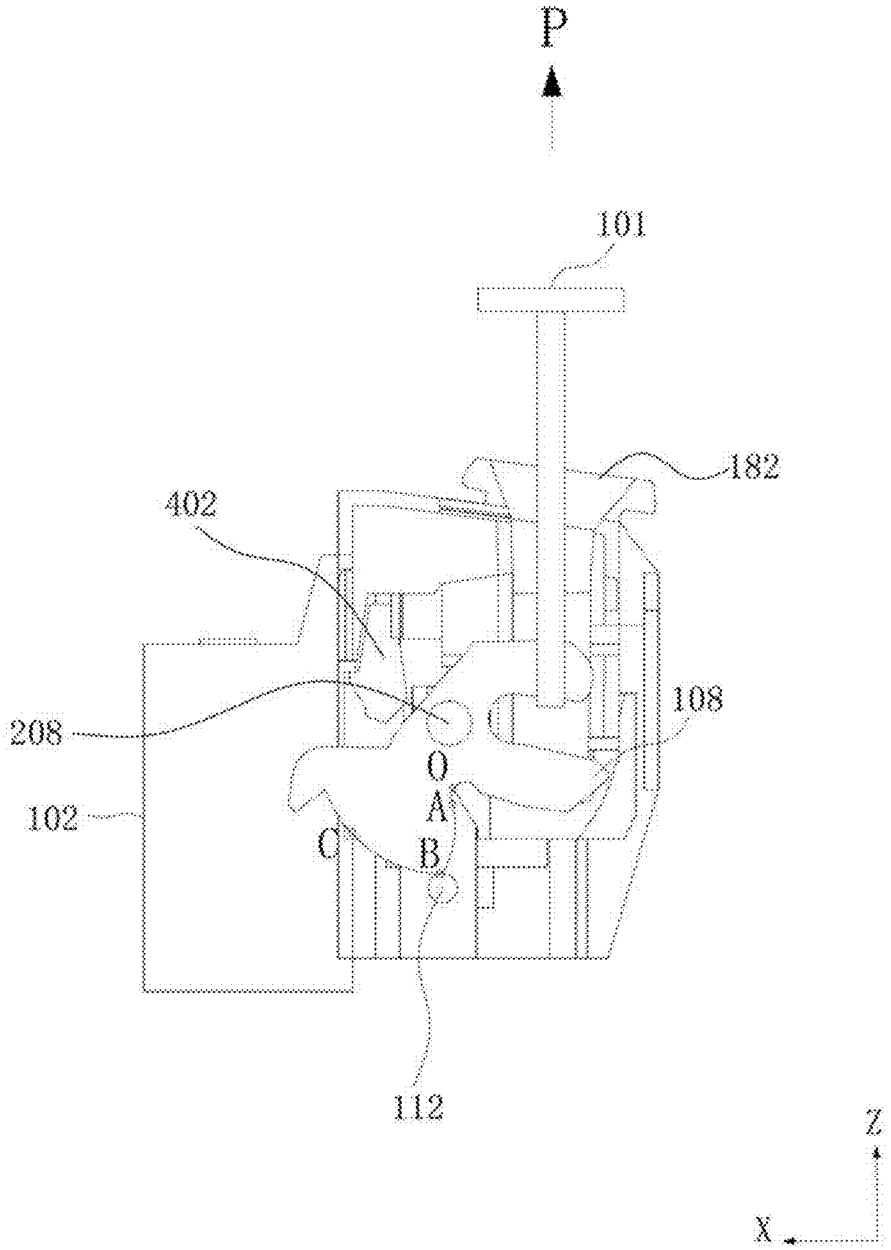
FIG. 7 is a schematic diagram of the door hook pulling the rotating wheel upward, wherein the pin shaft abuts against point B of the force bearing surface of the rotating wheel.

FIG. 6 is a schematic diagram of the door hook 101 pulling the rotating wheel 108 upward, wherein the pin shaft 112 abuts against the AB segment of the force bearing surface of the rotating wheel 108; and FIG. 7 is a schematic diagram of the door hook 101 pulling the rotating wheel 108 upward, wherein the pin shaft 112 abuts against point B of the force bearing surface of the rotating wheel 108.

As shown in FIGS. 5 to 7, the door-opening pulling force P continues to be applied to the rotating wheel 108 at a rotating wheel position shown in FIG. 5, and the rotating wheel 108 can rotate from the position shown in FIG. 5 and translate upward to a position shown in FIG. 6. In this case, the pin shaft 112 is moved relative to the rotating wheel 108 from the position of point A to the AB segment where the pin shaft abuts against the rotating wheel 108. With the continuous application of the door-opening pulling force P, the position of the pin shaft 112 relative to the rotating wheel 108 can pass through the AB segment to reach the position of point B.

At the AB segment, the rotating wheel 108 rotates counterclockwise and translates upward in the process of abutting against the pin shaft 112, and the curvature of the outer contour of the rotating wheel 108 at the AB segment gradually increases from point A to point B, such that the pin shaft 112 generates the counter-acting force F thereon, causing the door-opening pulling force P to steadily increase along with the door-opening displacement, and thus forming the shape of the curve's AB segment shown in FIG. 3B. At point B shown in FIG. 7, the door-opening pull force P or the internal push force reaches a peak value, which is in a range of 40-45 Newtons, and the door-opening displacement is about 8 mm.

Figure 8A:
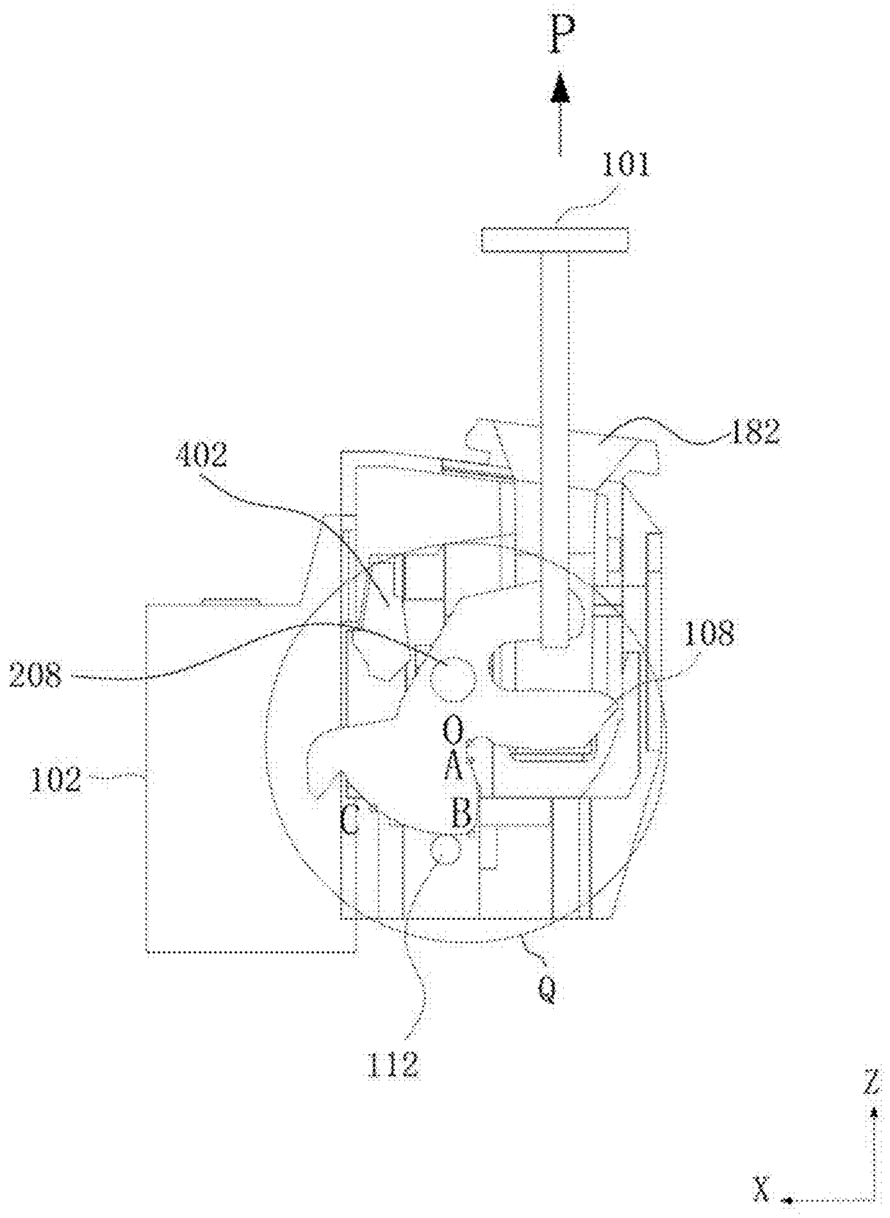
FIG. 8A is a schematic diagram of the pin shaft abutting against a BC segment of the force bearing surface of the rotating wheel.
Figure 8B:
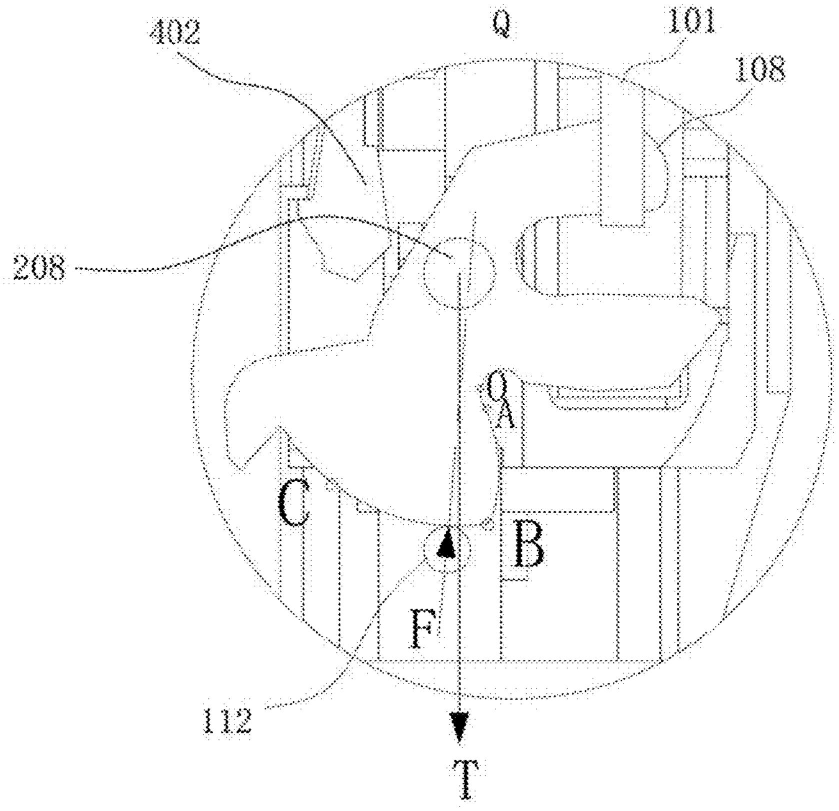
FIG. 8B is an enlarged view of the rotating wheel shown in FIG. 8A and a force analysis view Q.
Figure 8C:
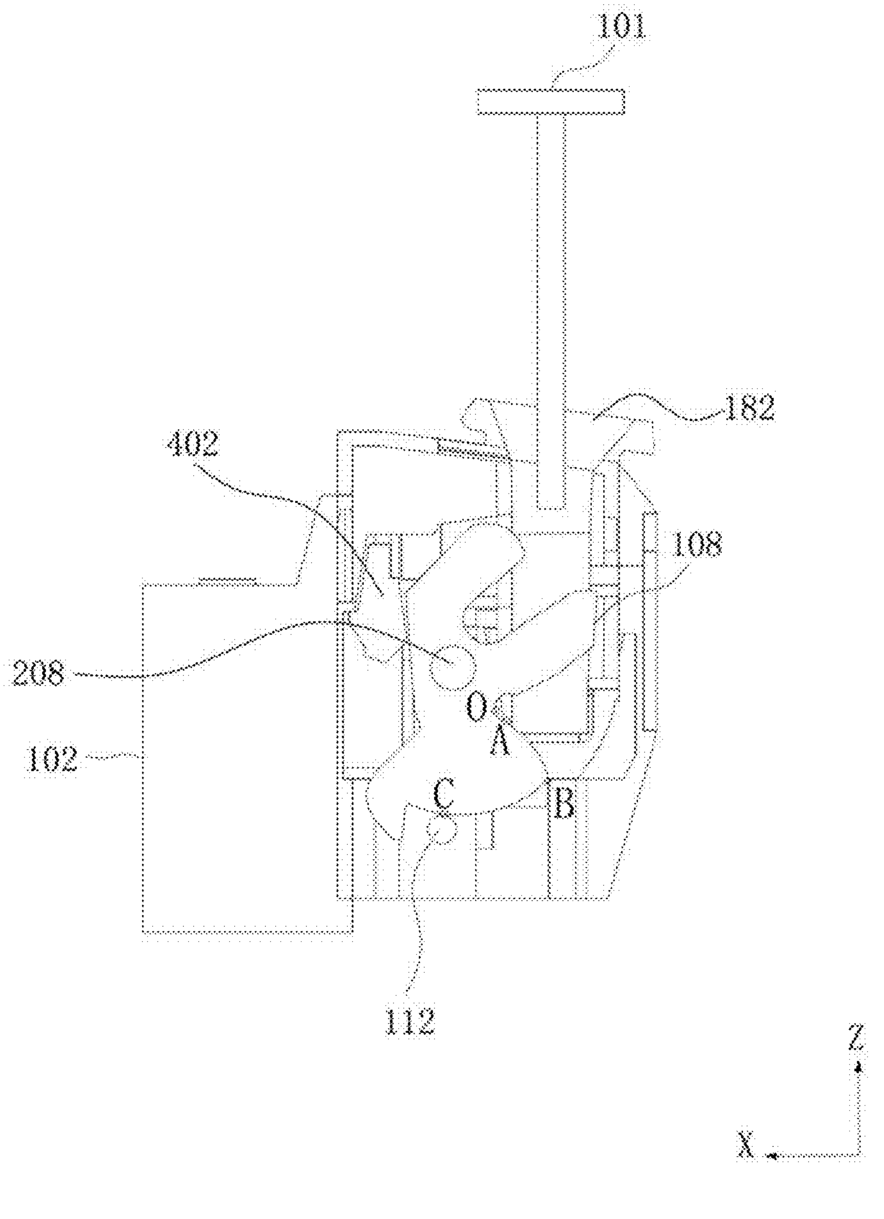
FIG. 8C is a schematic diagram of the pin shaft abutting, at point C, against the force bearing surface of the rotating wheel.

FIG. 8A is a schematic diagram of the pin shaft 112 abutting against the BC segment of the force bearing surface of the rotating wheel 108, FIG. 8B is an enlarged view of the rotating wheel 108 shown in FIG. 8A and a force analysis view Q, and FIG. 8C is a schematic diagram of the pin shaft 112 abutting, at point C, against the force bearing surface of the rotating wheel 108.

As shown in FIGS. 7 to 8A, the door-opening pulling force P continues to be applied to the rotating wheel 108 at the rotating wheel position shown in FIG. 7, and the rotating wheel 108 can rotate from the position shown in FIG. 7 and translate upward to a position shown in FIG. 8A. In this case, the pin shaft 112 is moved relative to the rotating wheel 108 from the position of point B to BC segment, where the pin shaft abuts against the rotating wheel 108.

As shown in FIG. 8B, once the position of the pin shaft 112 relative to the rotating wheel 108 exceeds point B to reach the BC segment, the rotating wheel 108 will automatically rotates counterclockwise to a stop position under the action of the spring force T of the bias springs and the counter-acting force F of the pin shaft 112, even without door-opening pull force P. Specifically, the force analysis of the rotating wheel 108 will be described below.

The curvature and shape of the BC segment are set such that in the direction of the counter-acting force F generated when the pin shaft 112 abuts against the rotating wheel 108 at the BC segment, a torque for counterclockwise rotation can be generated on the rotating wheel 108. Specifically, an act line of the counter-acting force F is located on the right side of the rotation center of the rotating wheel 108 (see a dotted line indicated in FIG. 8B). Meanwhile, the rotation radius of the rotating wheel 108 at the BC segment increases slightly from point B to point C, and the curvature of the rotating wheel 108 at the BC segment remains unchanged, such that the rotating wheel can continue to rotate counter-clockwise and move upward in the process of the rotating wheel 108 abutting against the pin shaft 112 at the BC segment. Under the action of the above counterclockwise torque, the rotating wheel 108 can rotate to a position where the rotating comes into contact with the rotating wheel stop part 402 and stops at this position. As shown in FIG. 8C, in this case, the pin shaft 112 moves to point C of the force bearing surface relative to the rotating wheel 108 and abuts against the rotating wheel 108 at point C, and the rotating wheel 108 abuts against the rotating wheel stop part 402 of the rotating wheel seat 104.

Since the rotating wheel 108 has a certain rotation speed when it abuts against the pin shaft 112 at the BC segment, the door hook 101 can be driven to move upward at a certain speed, such that after the rotating wheel 108 exceeds the position of point B and the internal push force is removed, the door is sprung outward to the door-opening position at a certain speed.

In the process of closing the door, under the action of the external push force, the rotating wheel 108 can rotate clockwise from the position shown in FIG. 8C to the position shown in FIG. 4A, and this movement process and a force bearing manner are opposite to the door-opening process, which will not be repeated.

Figure 9:
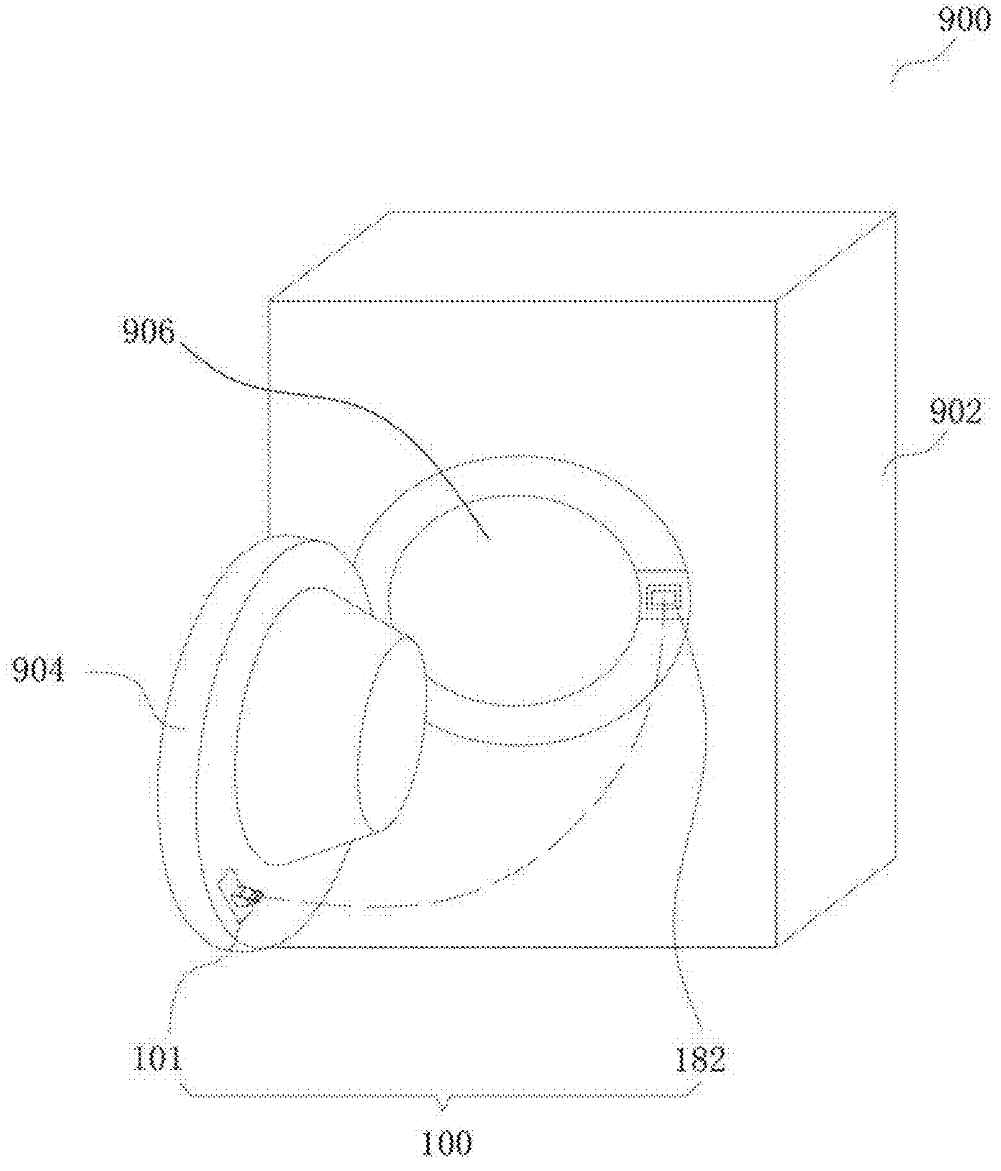
FIG. 9 is a schematic diagram of a dryer with a door lock assembly of the present disclosure in a door-opening position.

FIG. 9 is a schematic diagram of a dryer 900 with the door lock assembly 100 of the present disclosure in the door-opening position.

As shown in FIG. 9, the dryer 900 is provided with a dryer body 902, a door 904, a cavity 906, and the door lock assembly 100, wherein the door hook 101 is provided on an inner side of the door 904, and other components of the door lock assembly 100 are provided at positions of the dryer body 902 corresponding to the door hook 101. By closing the door 904, the door hook 101 can pass through the door hook hole 182 to be locked with the rotating wheel 108 inside the door lock assembly 100 in an engaged manner, thereby closing the cavity 906.

The dryer 900 shown in FIG. 9 is merely exemplary, and the door lock assembly 100 of the present disclosure can also be mounted on various types of electrical appliances each having a cavity and a door for closing the cavity, such as a washing machine, a dishwasher, and a microwave oven, and can further be mounted on other non-electrical appliances.

The present disclosure aims to at least partially solve the technical problems mentioned in this description. The door lock assembly of the present disclosure can at least achieve the following beneficial technical effects.

First, in the present disclosure, the compression or spring-back of the bias springs is limited in the barrel shaped cavities on the rotating wheel seat, the bias springs can generate a stable bias force on the rotating wheel seat and the rotating wheel, so that the movement of the rotating wheel seat and the rotating wheel inside the housing is smoother than that in the prior art, and thus the overall hand feel of the door-opening/closing action is smoother without any jerking, instability or unevenness.

Second, the cam part on the rotating wheel in the present disclosure is provided with two curved surfaces having different curvatures, and the rotating wheel abuts against the pin shaft fixedly provided inside the door lock housing by means of any one of the above-mentioned two curved surfaces having different curvatures; when the rotating wheel begins to rotate from the door-closing position, the internal push force for door opening can quickly increase to the magnitude approximate to the maximum door-opening force, and during the subsequent rotation of the rotating wheel, the door-opening force remains stable and slowly increases until the rotating wheel reaches a critical position for door opening. Such an arrangement has the advantages that: a force applied by laundry to the door is dissipated before reaching the critical position for door opening, so that even if the door is slightly displaced, the door cannot be pushed open, a child who accidentally enters the dryer can apply a continuous internal push force to the door, which can cause the cam to rotate beyond the critical position for door opening, and therefore the child can push the door open from the inside.

Although the present disclosure is described in conjunction with the examples of embodiments outlined above, various alternatives, modifications, variations, improvements, and/or substantial equivalents may be obvious to those of at least ordinary skill in the art, whether presently known or that may be envisaged in the near future. In addition, the technical effects and/or technical problems described in the present disclosure are illustrative rather than restrictive. Therefore, the disclosed description in the present disclosure may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

The invention claimed is:

1. A door lock assembly for locking a door of an electrical appliance, the door lock assembly comprising:

a rotating wheel, the rotating wheel having a rotating wheel door-closing position and a rotating wheel door-opening position during rotation, and the rotating wheel being configured such that when being subjected to an internal push force in a closing position of the door, the door can drive the rotating wheel to rotate from the rotating wheel door-closing position towards the rotating wheel door-opening position;

a pin shaft, the pin shaft and the rotating wheel abutting against each other and undergoing a relative movement during the movement of the rotating wheel;

wherein the rotating wheel is provided with a cam structure, the cam structure abuts against the pin shaft and has an outer side and an inner side connected to each other, the inner side has a first working side surface and a second working side surface connected to each other, the outer side has a third working side surface, the first working side surface is a concave surface having an inner diameter matching a pin shaft outer diameter, the second working side surface curves from the first working side surface to the third working side surface and protrudes in a first direction, and the third working side surface extends from the second working side surface and protrudes in a second direction that is different from the first direction; and in a door-opening process, the abutment position of the cam structure of the rotating wheel against the pin shaft sequentially transits from the first working side surface, through the second working side surface to the third working side surface, thereby causing a change in the internal push force;

wherein the first working side surface comprises a circular notch, the pin shaft snap fits into the circular notch, each of the first working side surface, the second working side surface, and the third working side surface have a different surface curvature, a first interaction force is required to move the rotating wheel when the pin shaft is in the circular notch, and at least one different second interaction force is required to move the rotating wheel when the pin shaft is against the second working side surface.

2. The door lock assembly of claim 1, wherein during the rotation of the rotating wheel from the rotating wheel door-closing position to the rotating wheel door-opening position, the abutment position of the pin shaft against the rotating wheel sequentially transits from the first working side surface, through the second working side surface to the third working side surface; and the internal push force increases at a first rate during the transition of the abutment position of the pin shaft and the rotating wheel from the first working side surface to the second working side surface, and the internal push force increases at a second rate or remains stable during the movement of the abutment position of the pin shaft against the rotating wheel at the second working side surface, wherein the second rate is less than the first rate.

3. The door lock assembly of claim 2, further comprising:

at least one bias device, the at least one bias device being configured to bias the rotating wheel on the pin shaft during the rotation of the rotating wheel to maintain the abutment of the rotating wheel and the pin shaft against each other.

4. The door lock assembly of claim 3, wherein when the internal push force disappears before the rotating wheel rotates to allow the pin shaft to come into abutment against the third working side surface, the rotating wheel returns to the rotating wheel door-closing position under the action of a bias force of the at least one bias device; and when the internal push force disappears after the rotating wheel rotates to allow the pin shaft to come into abutment against the third working side surface, the rotating wheel moves to the rotating wheel door-opening position under the action of the bias force of the at least one bias device.

5. The door lock assembly of claim 2, wherein if the internal push force is generated by clumped laundry in the electrical appliance impinging against the door, as the internal push force causes the rotating wheel to move from the rotating wheel door-closing position towards the rotating wheel door-opening position, if the clumped laundry is loosened before the rotating wheel moves to a position where the outer side surface abuts against the pin shaft, the internal push force disappears, and the rotating wheel can return to the rotating wheel door-closing position and thus closes the door; and if the internal push force is generated by manually continuing to push the door from the inside of the electrical appliance, as the internal push force causes the rotating wheel to move from the rotating wheel door-closing position towards the rotating wheel door-opening position, if the internal push force is removed after the rotating wheel moves to the position where the outer side surface abuts against the pin shaft, the rotating wheel can move to the rotating wheel door-opening position and thus opens the door.

6. The door lock assembly of claim 2, wherein when the “internal push force” is taken as the vertical coordinate and a “door-opening displacement” as the horizontal coordinate, the transition of the abutment position of the pin shaft against the rotating wheel from the first working side surface to the second working side surface corresponds to a first “internal push force versus door-opening displacement” curve, the movement of the abutment position of the pin shaft against the rotating wheel at the second working side surface corresponds to a second “internal push force versus door-opening displacement” curve, wherein the slope of the first “internal push force versus door-opening displacement” curve is larger than that of the second “internal push force versus door-opening displacement” curve.

7. The door lock assembly of claim 1, further comprising:

a housing, the pin shaft being fixed to the housing;

wherein the rotating wheel is movable relative to the pin shaft and the housing during the rotation of the rotating wheel; and wherein the rotating wheel door-closing position is corresponding to a closing position of the door, and the rotating wheel door-opening position is corresponding to an opening position of the door.

8. The door lock assembly of claim 7, wherein the rotating wheel comprises:

a rotating wheel middle section, the rotating wheel middle section being provided with a rotating shaft, the rotating shaft of the rotating wheel being capable of linear movement relative to the pin shaft during the rotation of the rotating wheel;

a rotating wheel head section, the rotating wheel head section being provided with lock hooks, the lock hooks being configured to be detachably connected to a door hook of the door, such that the door opening or closing causes the rotating wheel to rotate around the rotating shaft toward the rotating wheel door-opening position or the rotating wheel door-closing position; and a rotating wheel tail section, the rotating wheel tail section being provided with the cam structure, and the second working side surface of the cam structure having a variable curvature.

9. The door lock assembly of claim 8, further comprising:

a rotating wheel seat, the rotating wheel seat being movably accommodated inside the housing, the rotating shaft of the rotating wheel being rotatably mounted on the rotating wheel seat, the at least one bias device abutting between the rotating wheel seat and the housing, the rotating wheel seat being configured to move along with the rotation of the rotating wheel when the rotating wheel rotates, such that the rotating wheel and the rotating wheel seat are movable inside the housing, and the at least one bias device is compressed or springs back during the movement of the rotating wheel seat inside the housing.

10. The door lock assembly of claim 9, wherein the first working side surface is a notch;

the second working side surface is an ascending slope surface of increasing radius in a rotating wheel door-opening direction provided on the inner side of the cam structure;

the outer side surface is a descending slope surface of decreasing radius in the rotating wheel door-opening direction provided on the outer side of the cam structure;

the notch and the ascending slope surface are connected at a slope surface inflection point; and the ascending slope surface and the descending slope surface are connected at a slope surface meeting point, the curvature of the ascending slope surface gradually increases from the slope surface inflection point to the slope surface meeting point.

11. The door lock assembly of claim 10, wherein when the rotating wheel is in the rotating wheel door-opening position, the pin shaft abuts against a door-opening stop point of the rotating wheel on the descending slope surface;

wherein the notch in the inner side of the cam structure and the door-opening stop point are stable positions during the rotation of the rotating wheel, and all positions of the cam structure other than the notch and the door-opening stop point are transitional positions during the rotation of the rotating wheel.

12. The door lock assembly of claim 11, wherein when the rotating wheel is in the rotating wheel door-closing position, the pin shaft is located in the stable position of the notch, and when the rotating wheel is in the rotating wheel door-opening position, the pin shaft is located in the stable position of the door-opening stop point; and during the rotation of the rotating wheel from the rotating wheel door-closing position towards the rotating wheel door-opening position, the abutment position of the pin shaft against the cam structure of the rotating wheel is moved, such that the abutment position of the pin shaft relative to the rotating wheel sequentially passes through the ascending slope surface and the descending slope surface from the notch, and finally reaches the door-opening stop point.

13. The door lock assembly of claim 12, wherein the at least one bias device is configured, in a door-opening process, such that if the internal push force causes the rotating wheel to move relative to the pin shaft and to abut against a position between the notch and the slope surface meeting point, the at least one bias device can return, after the internal push force disappears, the rotating wheel relative to the pin shaft and to abut against the pin shaft at the stable position of the notch; and if the internal push force causes the rotating wheel to move relative to the pin shaft and to abut against a position between the slope surface meeting point and the door-opening stop point, the at least one bias device can continue to move, after the internal push force disappears, the rotating wheel relative to the pin shaft and to abut against the pin shaft at the stable position of the door-opening stop point.

14. An electrical appliance, comprising the door lock assembly of claim 1.

15. A door lock assembly for locking a door of an electrical appliance, the door lock assembly comprising:

a rotating wheel, the rotating wheel having a rotating wheel door-closing position and a rotating wheel door-opening position during rotation, and the rotating wheel being configured such that when the door is subjected to an internal push force in a closing position of the door, the rotating wheel can rotate from the rotating wheel door-closing position towards the rotating wheel door-opening position;

a force adjustment device, the force adjustment device being configured to apply an adjustment force to the rotating wheel, which allows the rotating wheel to have two sections of rotation paths during the rotation thereof from the rotating wheel door-closing position towards the rotating wheel door-opening position, and the two sections of rotation paths comprising: a first section of rotation path and a second section of rotation path, the first section of rotation path having a first path start point and a first path end point, the second section of rotation path having a second path start point and a second path end point, and the first path end point coinciding with the second path start point;

wherein when the rotating wheel moves between the first path start point and the first path end point of the first section of rotation path, there is a first ratio of a change in magnitude of the internal push force to a change in displacement of the door;

wherein when the rotating wheel moves between the second path start point and the second path end point of the first section of rotation path, there is a second ratio of the change in magnitude of the internal push force to the change in displacement of the door;

wherein the first ratio is greater than the second ratio;

wherein the internal push force is a variable internal push force, if the variable internal push force is capable of moving the rotating wheel to any position between the first path start point and the second path end point, the rotating wheel returns to the rotating wheel door-closing position after the variable internal push force disappears; and if the variable internal push force moves the rotating wheel to a position beyond the second path end point, the rotating wheel moves along a third section of rotation path to the rotating wheel door-opening position after the variable internal push force disappears;

wherein the force adjustment device is a pin shaft and the rotating wheel is provided with a cam structure, the cam structure abuts against the pin shaft and has an outer side and an inner side connected to each other, the inner side has a first working side surface and a second working side surface connected to each other, the outer side has a third working side surface, the first working side surface is a concave surface having an inner diameter matching a pin shaft outer diameter, the second working side surface curves from the first working side surface to the third working side surface and protrudes in a first direction, and the third working side surface extends from the second working side surface and protrudes in a second direction that is different from the first direction; and in a door-opening process, the abutment position of the cam structure of the rotating wheel against the pin shaft sequentially transits from the first working side surface, through the second working side surface to the third working side surface; and wherein the first working side surface comprises a circular notch, the pin shaft snap fits into the circular notch, each of the first working side surface, the second working side surface, and the third working side surface have a different surface curvature, a first interaction force is required to move the rotating wheel when the pin shaft is in the circular notch, and at least one different second interaction force is required to move the rotating wheel when the pin shaft is against the second working side surface.

16. The door lock assembly of claim 15, further comprising:

a rotating wheel seat, the rotating wheel seat being configured such that the rotating wheel seat is driven by the rotating wheel to move when rotating along with the rotating wheel;

at least one bias device, the at least one bias device being configured such that if an adjustment force applied by the force adjustment device to the rotating wheel is capable of moving the rotating wheel to a position beyond the second path end point, the at least one bias device moves the rotating wheel to the rotating wheel door-opening position after the variable internal push force disappears; and if the adjustment force exerted by the force adjustment device on the rotating wheel is capable of moving the rotating wheel to any position between the first path start point and the second path end point, the at least one bias device returns the rotating wheel to the rotating wheel door-closing position after the variable internal push force disappears;

wherein the rotating wheel door-closing position is corresponding to the closing position of the door, and the rotating wheel door-opening position is corresponding to the opening position of the door.

17. The door lock assembly of claim 16, wherein the rotating wheel comprises:

a rotating wheel head section, a rotating wheel middle section and a rotating wheel tail section, the rotating wheel middle section is provided with the rotating shaft, the rotating wheel head section is provided with lock hooks, the lock hooks are configured to be capable of engaging with the door hook, and inserting the door hook into a door hook hole or pulling out the door hook from the door hook hole causes the rotating wheel to rotate around the rotating shaft in the door-opening direction or the door-closing direction;

the rotating wheel tail section is provided with the cam structure;

wherein the first working side surface is corresponding to the first "internal push force versus door-opening displacement" curve, and the second working side surface is corresponding to the second "internal push force versus door-opening displacement" curve.

18. The door lock assembly of claim 17, wherein the first working side surface is provided in the inner side of the cam structure;

the second working side surface is an ascending slope surface provided on the inner side of the cam structure;

the outer side surface is a descending slope surface provided on the outer side of the cam structure;

the ascending slope surface and the descending slope surface are connected at the slope surface meeting point;

when the rotating wheel is in the rotating wheel door-opening position, the pin shaft abuts against the door-opening stop point of the rotating wheel on the descending slope surface;

wherein the notch in the inner side of the cam structure and the door-opening stop point are stable positions during the rotation of the rotating wheel, and all positions of the rotating wheel other than the notch and the door-opening stop point are transitional positions during the rotation of the rotating wheel;

wherein when the rotating wheel is in the rotating wheel door-closing position, the pin shaft is located in the stable position of the notch, and when the rotating wheel is in the rotating wheel door-opening position, the pin shaft is located in the stable position of the door-opening stop point; and wherein during the rotation of the rotating wheel from the rotating wheel door-closing position towards the rotating wheel door-opening position, the pin shaft and the rotating wheel contact and perform relative movement, such that the pin shaft reaches the door-opening stop point from the notch by passing through the ascending slope surface and the descending slope surface.

19. The door lock assembly of claim 18, wherein the relative movement of the pin shaft from the notch of the rotating wheel to the ascending slope surface is corresponding to the first section of rotation path; and the relative movement of the pin shaft from the ascending slope surface of the rotating wheel to the slope surface meeting point is corresponding to the second section of rotation path.

20. The door lock assembly of claim 19, wherein the shape of the first "internal push force versus door-opening displacement" curve depends on the shape of the notch; and the shape of the second "internal push force versus door-opening displacement" curve depends on the shape of the ascending slope surface.

21. The door lock assembly of claim 20, wherein there is further a third section of rotation path during the rotation of the rotating wheel from the rotating wheel door-closing position towards the rotating wheel door-opening position; and the relative movement of the pin shaft from the slope surface meeting point of the rotating wheel to the door-opening stop point by passing through the descending slope surface is corresponding to the third section of rotation path.

22. The door lock assembly of claim 21, wherein the at least one bias device is configured, in a door-opening process, such that if the variable internal push force moves the pin shaft relative to the rotating wheel to a position before the slope surface meeting point, the at least one bias device can return the pin shaft to the stable position of the notch after the variable internal push force disappears; and if the variable internal push force moves the pin shaft relative to the rotating wheel to a position beyond the slope surface meeting point, the at least one bias device can continue to move, after the variable internal push force disappears, the pin shaft relative to the rotating wheel to the stable position of the door-opening stop point.

23. The door lock assembly of claim 22, further comprising:

a housing, the force adjustment device being fixed to the housing;

a rotating wheel seat, the rotating wheel seat being movably accommodated inside the housing, the rotating shaft of the rotating wheel being rotatably mounted on the rotating wheel seat, such that the rotating shaft of the rotating wheel can drive the rotating wheel seat to perform the linear movement relative to the housing during the rotation of the rotating wheel;

the at least one bias device abuts between the rotating wheel seat and the housing; and when the rotating wheel rotates on the rotating wheel seat, the rotating wheel and the rotating wheel seat can move inside the housing, and the at least one bias device can be compressed or spring back during the movement of the rotating wheel seat inside the housing.

* * * * *